US012748947B1

(12) United States Patent
Graves et al.

(10) Patent No.: US 12,748,947 B1
(45) Date of Patent: Sep. 29, 2026

(54) SYSTEMS AND METHODS FOR INTELLIGENTLY FOLDING NORMALIZATION AND WEIGHT PARAMETERS DURING A TRAINING OF AN ARTIFICIAL NEURAL NETWORK

(71) Applicant: Mythic, Inc., Round Rock, TX (US)

(72) Inventors: Daniel Graves, Edmonton (CA); Michael Klachko, Miami, FL (US); Dave Fick, Cedar Park, TX (US); Michail Tzoufras, San Francisco, CA (US)

(73) Assignee: Mythic, Inc., Round Rock, TX (US)

( * ) Notice: Subject to any disclaimer, the term of this patent is extended or adjusted under 35 U.S.C. 154(b) by 0 days.

(21) Appl. No.: 19/578,037

(22) Filed: Mar. 25, 2026

Related U.S. Application Data

(60) Provisional application No. 63/984,372, filed on Feb. 17, 2026.

(51) Int. Cl.
*G06N 3/042* (2023.01)
*G06N 3/0464* (2023.01)
*G06N 3/048* (2023.01)

(52) U.S. Cl.
CPC ........... *G06N 3/042* (2023.01); *G06N 3/0464* (2023.01); *G06N 3/048* (2023.01)

(58) Field of Classification Search
None
See application file for complete search history.

(56) References Cited

PUBLICATIONS

Ioffe, Sergey, and Christian Szegedy. "Batch normalization: Accelerating deep network training by reducing internal covariate shift." International conference on machine learning. pmlr, 2015. (Year: 2015).*
Santurkar, Shibani, et al. "How does batch normalization help optimization?." Advances in neural information processing systems 31 (2018). (Year: 2018).*
(Continued)

*Primary Examiner* — Vincent Gonzales
(74) *Attorney, Agent, or Firm* — Padowithz Alce; Quintin Scheitlin; ALCE PLLC

(57) ABSTRACT

Systems and methods for generating a hardware-executable artificial neural network are disclosed. A training system accesses a network graph representing a pre-trained artificial neural network including a plurality of computational nodes. The training system transforms the network graph by replacing at least one computational node with a system-generated node that combines computational operations and normalization operations. During retraining of the artificial neural network, parameters associated with the normalization operations and the computational operations are folded to generate integrated parameters including a folded weight matrix and a folded bias matrix. The integrated parameters are updated during training and scaled according to a weight-representation heuristic. Output activations associated with the integrated node may also be scaled based on a composite scaling factor that improves signal-to-noise characteristics. Based on the retraining, a hardware-execution graph corresponding to the artificial neural network is generated and compiled into instructions executable by a matrix multiply accelerator or other integrated circuit configured to execute the artificial neural network.

18 Claims, 12 Drawing Sheets

(56) References Cited

PUBLICATIONS

Yvinec, Edouard, Arnaud Dapogny, and Kevin Bailly. "To fold or not to fold: a necessary and sufficient condition on batch-normalization layers folding." arXiv preprint arXiv:2203.14646 (2022). (Year: 2022).*

* cited by examiner

SYSTEMS AND METHODS FOR INTELLIGENTLY FOLDING NORMALIZATION AND WEIGHT PARAMETERS DURING A TRAINING OF AN ARTIFICIAL NEURAL NETWORK

CROSS-REFERENCE TO RELATED APPLICATIONS

This application claims the benefit of U.S. Provisional Application No. 63/984,372, filed 17 Feb. 2026, which is incorporated in its entirety by this reference.

TECHNICAL FIELD

The inventions described herein relate generally to the integrated circuitry architecture field, and more specifically to new and useful intelligent integrated circuits and methods of computing with the intelligent integrated circuit in the integrated circuitry architecture field.

BACKGROUND

Today, the various implementations of artificial intelligence and machine learning are driving innovation in many fields of technology. Artificial intelligence (AI) systems and artificial intelligence models (including algorithms) are defined by many system architectures and models that enable machine learning (deep learning), reasoning, inferential capacities, and large data processing capabilities of a machine (e.g., a computer and/or a computing server). These AI systems and models are often trained intensively to perform one or more specific tasks, such as natural language processing, image recognition, planning, decision-making, and the like. For example, a subset of these AI systems and models includes artificial neural network models. The training of an artificial neural network model may, in many cases, require thousands of hours across the training cycle and many terabytes of training data to fine tune associated neural network algorithm(s) of the model before use.

However, once trained, a neural network model or algorithm may be deployed quickly to make inferences to accomplish specific tasks (e.g., recognizing speech from speech input data, etc.) based on relatively smaller datasets when compared to the larger training datasets used during the training cycle. The inferences made by the neural network model or algorithm based on the smaller datasets may be a prediction about what the neural network model calculates to be a correct answer or indication about a circumstance.

Still, while neural network models implementing one or more neural network algorithms may not require a same amount of compute resources, as required in a training phase, deploying a neural network model in the field continues to require significant circuitry area, energy, and compute power to classify data and infer or predict a result. For example, weighted sum calculations are commonly used in pattern matching and machine learning applications, including neural network applications. In weighted sum calculations, an integrated circuit may function to multiply a set of inputs ($x_i$) by a set of weights ($w_i$) and sum the results of each multiplication operation to calculate a final result (z). Typical weighted sum calculations for a machine learning application, however, include hundreds or thousands of weights which causes the weighted sum calculations to be computationally expensive to compute with traditional digital circuitry. Specifically, accessing the hundreds or thousands of weights from a digital memory requires significant computing time (i.e., increased latency) and significant energy.

Accordingly, traditional digital circuitry required for computing weighted sum computations of a neural network model or the like tend to be large to accommodate a great amount of digital memory circuitry needed for storing the millions of weights required for the neural network model. Due to the large size of the circuitry, more energy is required to enable the compute power of the many traditional computers and circuits.

Additionally, these traditional computers and circuits for implementing artificial intelligence models and, namely, neural network models may be suitable for remote computing processes, such as in distributed computing systems (e.g., the cloud), or when using many onsite computing servers and the like. However, latency problems are manifest when these remote artificial intelligence processing systems are used in computing inferences and the like for remote, edge computing devices or in field devices. That is, when these traditional remote systems seek to implement a neural network model for generating inferences to be used in remote field devices, there are unavoidable delays in receiving input data from the remote field devices because the input data must often be transmitted over a network with varying bandwidth and subsequently, inferences generated by the remote computing system must be transmitted back to the remote field devices via a same or similar network. Additionally, these traditional circuit often cannot manage the computing load (e.g., limited storage and/or limited compute) and may often rely on remote computing systems, such as the cloud, to perform computationally-intensive computations and store the computation data (e.g., raw inputs and outputs). Thus, constant and/or continuous access (e.g., 24×7 access) to the remote computing systems (e.g., the cloud) is required for continuous operation, which may not be suitable in many applications either due to costs, infrastructure limitations (e.g., limited bandwidth, low grade communication systems, etc.), and the like.

Implementing AI processing systems at the field level (e.g., locally at the remote field device) may be a proposed solution to resolve some of the latency issues. However, attempts to implement some of these traditional AI computers and systems at an edge device (e.g., remote field device) may result in a bulky system with many circuits, as mentioned above, that consumes significant amounts of energy due to the required complex architecture of the computing system used in processing data and generating inferences. Thus, such a proposal without more may not be feasible and/or sustainable with current technology.

Accordingly, there is a need for a deployable system for implementing artificial intelligence models locally in the field (e.g., local AI), and preferably to be used in edge devices, that do not result in large, bulky (edge) devices, that reduces latency, and that have necessary compute power to make predictions or inferences, in real-time or substantially real-time, while also being energy efficient.

The below-described embodiments of the present application provide such advanced and improved integrated circuits and implementation techniques capable of addressing the deficiencies of traditional systems and integrated circuit architectures for implementing AI and machine learning.

BRIEF SUMMARY OF THE EMBODIMENTS

In one embodiment, a computer-implemented method for generating a hardware-executable artificial neural network for execution on a matrix multiply accelerator includes accessing a network graph representing a pre-trained artificial neural network, the network graph comprising a plurality of nodes including at least one computational node configured to perform a weighted sum operation; transforming, by one or more processors, the network graph into a transformed network graph by replacing the at least one computational node with a system-generated node that includes computational operations corresponding to the computational node and normalization operations associated with a normalization layer; initializing one or more normalization parameters of the system-generated node based on statistics derived from training data; retraining the artificial neural network using the transformed network graph, wherein retraining includes folding parameters of the normalization operations and parameters of the computational operations to generate an integrated node having a folded weight matrix and a folded bias matrix, updating the folded weight matrix and the folded bias matrix during training iterations, scaling the folded weight matrix and the folded bias matrix based on a weight-representation heuristic, and scaling output activations associated with the integrated node based on a composite scaling factor that increases a signal-to-noise ratio of the output activations; generating, based on the retraining, a hardware-execution graph corresponding to the artificial neural network; and compiling the hardware-execution graph into instructions executable by the matrix multiply accelerator.

In one embodiment, transforming the network graph further includes identifying an activation node succeeding the computational node and associating an activation function of the activation node with the system-generated node such that the activation function is executed as an attribute of the system-generated node.

In one embodiment, retraining the artificial neural network further includes modeling hardware characteristics of the matrix multiply accelerator by injecting simulated noise or distortion into intermediate outputs of the transformed network graph.

In one embodiment, scaling the folded weight matrix and the folded bias matrix further includes splitting a bias value of the folded bias matrix into a plurality of bias components distributed across multiple bias storage locations of the matrix multiply accelerator.

In one embodiment, transforming the network graph further includes identifying a normalization node adjacent to the computational node and grouping the normalization node and the computational node into the system-generated node.

In one embodiment, folding the parameters of the normalization operations and the parameters of the computational operations includes folding parameters of a batch normalization operation into parameters of a linear node.

In one embodiment, folding the parameters of the normalization operations and the parameters of the computational operations includes folding parameters of a batch normalization operation into parameters of a convolutional node.

In one embodiment, scaling the folded weight matrix and the folded bias matrix includes computing the weight-representation heuristic using at least one of a mean value, a median value, or a percentile value derived from a combined weight and bias matrix.

In one embodiment, scaling the output activations associated with the integrated node further includes identifying a dominant channel associated with the integrated node and computing the composite scaling factor based on a signal range of the dominant channel.

In one embodiment, the transformed network graph includes a residual connection between nodes of the artificial neural network, and scaling the output activations further includes balancing signal ranges of tensors associated with the residual connection before combining the tensors at an addition node.

In one embodiment, initializing the normalization parameters includes computing normalization statistics including a mean value and a variance value derived from training data associated with outputs of the computational node.

In one embodiment, initializing the normalization parameters further includes computing scale and offset parameters based on the normalization statistics.

In one embodiment, retraining the artificial neural network further includes updating normalization statistics of the system-generated node during training iterations using batches of the training data.

In one embodiment, generating the hardware-execution graph further includes removing nodes used during retraining that simulate hardware effects and that are not required during inference on the matrix multiply accelerator.

In one embodiment, compiling the hardware-execution graph further includes inserting scaling operations such that signals propagated between nodes remain within a dynamic range supported by the matrix multiply accelerator.

In one embodiment, the matrix multiply accelerator includes a plurality of processing tiles including matrix multiply units and local memory units storing weights associated with the artificial neural network.

In one embodiment, a system for generating a hardware-executable artificial neural network for execution on a matrix multiply accelerator includes one or more processors and one or more non-transitory computer-readable storage media storing instructions that, when executed by the one or more processors, cause the system to access a network graph representing a pre-trained artificial neural network comprising a plurality of nodes including at least one computational node configured to perform a weighted sum operation; transform the network graph into a transformed network graph by replacing the computational node with a system-generated node comprising computational operations corresponding to the computational node and normalization operations associated with a normalization layer; initialize normalization parameters of the system-generated node based on statistics derived from training data; retrain the artificial neural network using the transformed network graph, wherein retraining includes folding parameters of the normalization operations and parameters of the computational operations to generate an integrated node having a folded weight matrix and a folded bias matrix, updating the folded weight matrix and the folded bias matrix during training iterations, scaling the folded weight matrix and the folded bias matrix based on a weight-representation heuristic, and scaling output activations associated with the integrated node based on a composite scaling factor that increases a signal-to-noise ratio of the output activations; generate a hardware-execution graph corresponding to the artificial neural network; and compile the hardware-execution graph into instructions executable by the matrix multiply accelerator.

In one embodiment, transforming the network graph further includes identifying an activation node adjacent to the computational node and associating an activation function of the activation node with the system-generated node.

In one embodiment, a computer-implemented method for generating an artificial neural network configured for execution on an integrated circuit includes accessing, by one or more processors of a training system, a network graph representing a pre-trained artificial neural network, the network graph comprising a plurality of nodes representing computational operations of the artificial neural network; transforming the network graph into a transformed network graph by replacing at least one of the nodes with a system-generated node representing a combination of a normalization operation and a computational operation; retraining the artificial neural network using the transformed network graph, wherein retraining includes folding parameters associated with the normalization operation and parameters associated with the computational operation to generate integrated parameters associated with the system-generated node; updating the integrated parameters during retraining based on training data; and generating a machine-executable representation of the artificial neural network configured for execution on the integrated circuit.

In one embodiment, transforming the network graph further includes identifying a normalization node adjacent to the at least one node and replacing the normalization node and the at least one node with the system-generated node in the transformed network graph.

DESCRIPTION OF THE PREFERRED EMBODIMENTS

Figure 1:
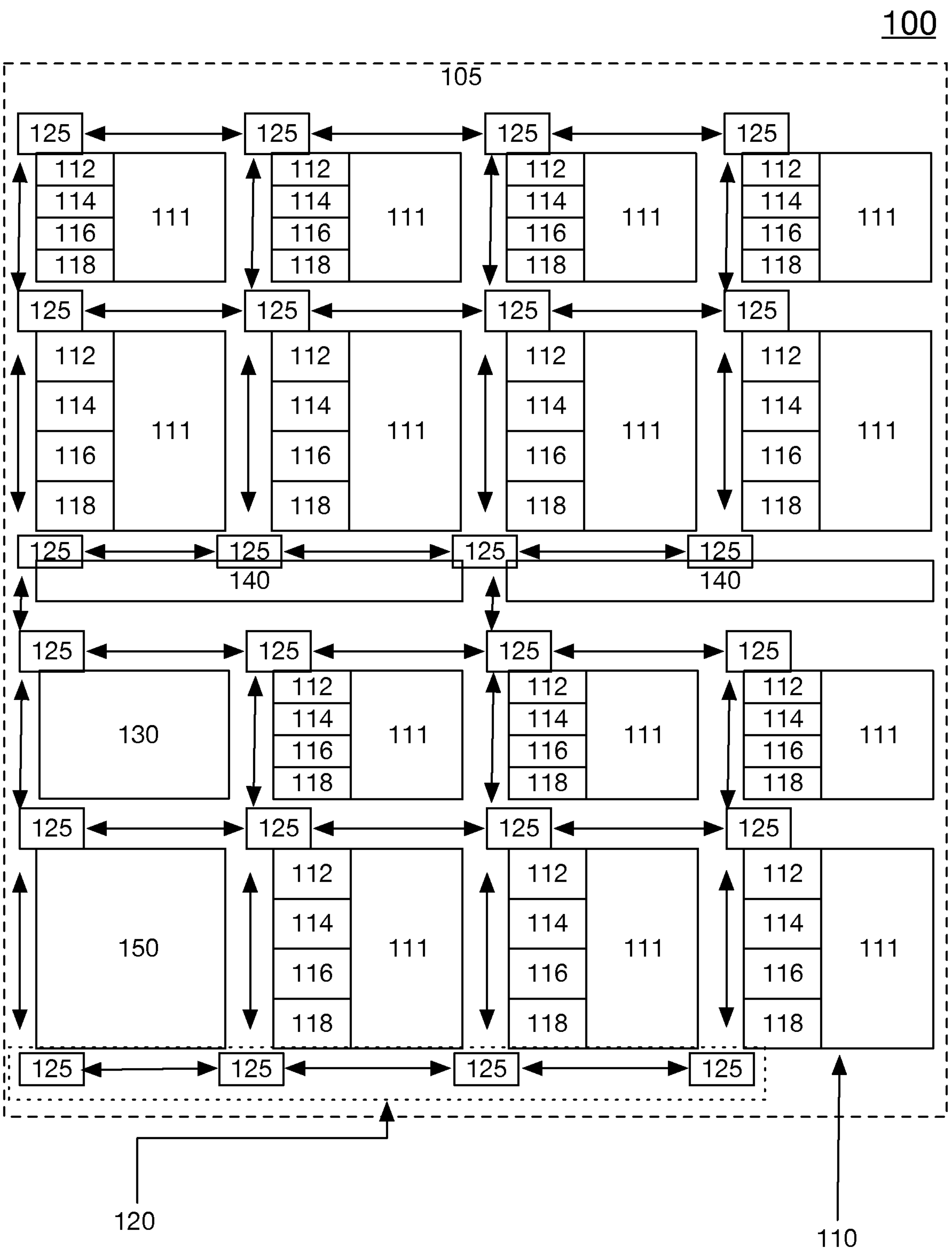
FIGS. 1-1A illustrates a schematic of an intelligence integrated circuit 100 in accordance with one or more embodiments of the present application.

The following description of preferred embodiments of the present application are not intended to limit the inventions to these preferred embodiments, but rather to enable any person skilled in the art of to make and use these inventions.

1. Intelligence Processing Overview

Embodiments of the present application provide a flexible and reprogrammable system that can be programmed to accommodate various computationally-intensive applications or programs of varying complexity and size. While a physical configuration of an integrated circuit architecture according to one or more embodiments of the present application may remain the same or substantially the same, disparate processing elements within the architecture may be programmed to handle multiple applications or one or more sections of a single application.

Further, an implementation and particular arrangement of the storage devices implemented within one or more embodiments of the present application provide several technical benefits over state-of-the-art integrated circuits, including reducing a total requirement of memory or storage required for handling data-intensive applications or programs. For instance, in one embodiment, a distributed memory may include a main (large) buffer may be provided to receive input data (e.g., raw input data or data from an upstream layer or source) and each of a plurality of disparate local buffers may be arranged together with a computing element (e.g., a matrix multiply accelerator) 111. In such embodiment, each local buffer may be arranged adjacent to or in an immediate vicinity of the computing element for fast access and therefore, efficient processing of input data from the main buffer.

Additionally, such an arrangement may allow for asynchronous processing of data along a data processing pipeline thereby enabling multiple segments of data to be processed at a same time and possibly in different stages along the pipeline. That is, in some embodiments, the asynchronous processing of data by the one or more components of the integrated circuit may enable a processing of a plurality of distinct sets of data that may not be in perfect lockstep while enabling simultaneous and/or parallel workflows along distinct components of a data processing pipeline. Such embodiments, the requirement for duplication of data may be significantly reduced.

Additionally, one or more embodiments of the present application may function to implement a token-driven data processing system in which a central process control may not be required.

Specifically, in one or more embodiments, an integrated circuit of the present application may include an architecture that may trigger microprocessor (e.g., a nano-processor which may include a microcontroller that may be local to each compute tile of an integrated circuit) programs and/or applications using tokens. A token as referred to herein preferably relate to a piece of data that evidences or represents an occurrence or an existence of a computing event or transaction and may, additionally or alternatively, evidence or represent a state of one or more components of an integrated circuit. In a non-limiting example, in the circumstances in which a token represents a state of an integrated circuit component, the token may indicate whether a buffer is empty or full, occupied or unoccupied, whether a processor is On or Off, busy (processing) or not busy (not processing), whether an item is processed or unprocessed, and/or the like. While, in many embodiments described herein, the tokens may be used for automatically triggering an execution and/or implementation of programs or applications, in various implementations the tokens may be used to trigger other units. A few examples include, using a combination of one or more instances or one or more tokens may indicate that an action or transaction of an integrated circuit has permission to proceed; possibly, meaning that all the dependent actions of the action or transaction have occurred. Thus, the tokens may be used to trigger finite state machines, trigger a release of a packet or a work-queue item, trigger the generation of another token, and/or the like. There may be limitless applications of the token-based governance module (sometimes referred to herein as the flow scoreboard module), described in several of the embodiments, for automatically triggering any type and/or any number of functions/operations with the integrated circuit.

In a preferred embodiment of the present application, the integrated circuit architecture may include a network-on-chip system that enables a communication and/or passing of tokens between distinct components of the integrated circuit. Accordingly, in some embodiments, the tokens may represent pieces of dependencies that enable components of the integrated circuit to receive new workloads triggered by an appropriate combination and/or count of one or more tokens. However, it shall be noted that any suitable token communication scheme and/or interconnect may be used including, but not limited to, serial communication buses or the like. For instance, in one embodiment of the present application, a token may not be released and/or generated (irrespective of an interconnect) until an associated triggering event is completed (e.g., an emptying of a local data buffer, a computation by an MMA or the like against input data, and/or any suitable event). In yet another embodiment, a token may be generated and/or released in advance of an associated triggering event if the early release of the token would not cause ordering constraints to be violated. Accordingly, in several of the embodiments of the present application, it shall be noted that the tokens can be deployed in any suitable manner to achieve a token-based control of the flow of data and/or the processing of data throughout an integrated circuit.

Additionally, the token-based governance module described herein may generally function to enable a token-based control by tracking tokens and token triggering conditions and the like. The token-based governance module may have configurable constraints so that triggering may also depend on a state of a local unit or circuit and not only based on a number of tokens identified or received. That is, in several embodiments of the present application, data flow, data processing, one or more operations/functions and the like may be governed based on the release or generation of tokens, it shall be noted that simply determining and/or identifying a state of a component of the integrated circuit and/or identifying a state of a process or operation within the integrated circuit may serve as a triggering event for yet automating another operation, function, process, or flow. For instance, a state of the utilization (e.g., depth) and/or capacity of one or more work queues may function as a triggering event. A technical benefit of such embodiments may be that an operation may only run when computing resources (e.g., space with the one or more work queues) that may be required are available. Accordingly, the embodiments of the present application may provide a flexibility in how events and/or dependencies are configured that trigger an automated operation, function, or process and therefore, allow for the generation of more complex programs or applications that use greater resources or resources more efficiently, which improves an operating efficiency of the one or more systems described herein by reducing a number of events that need to be generated in order to perform some action.

It shall be noted that, in some embodiments, various and/or different tokens may be implemented by a token-based data processing integrated circuit, as described in more detail as in U.S. Pat. No. 10,606,797, which is incorporated herein in its entirety by this reference. In some embodiments, a triggering condition for performing an action within the integrated circuit may be achieved by a minimum number of counts of each of several distinct token types.

2. Intelligence Processing Computing Architecture

Figure 1A:
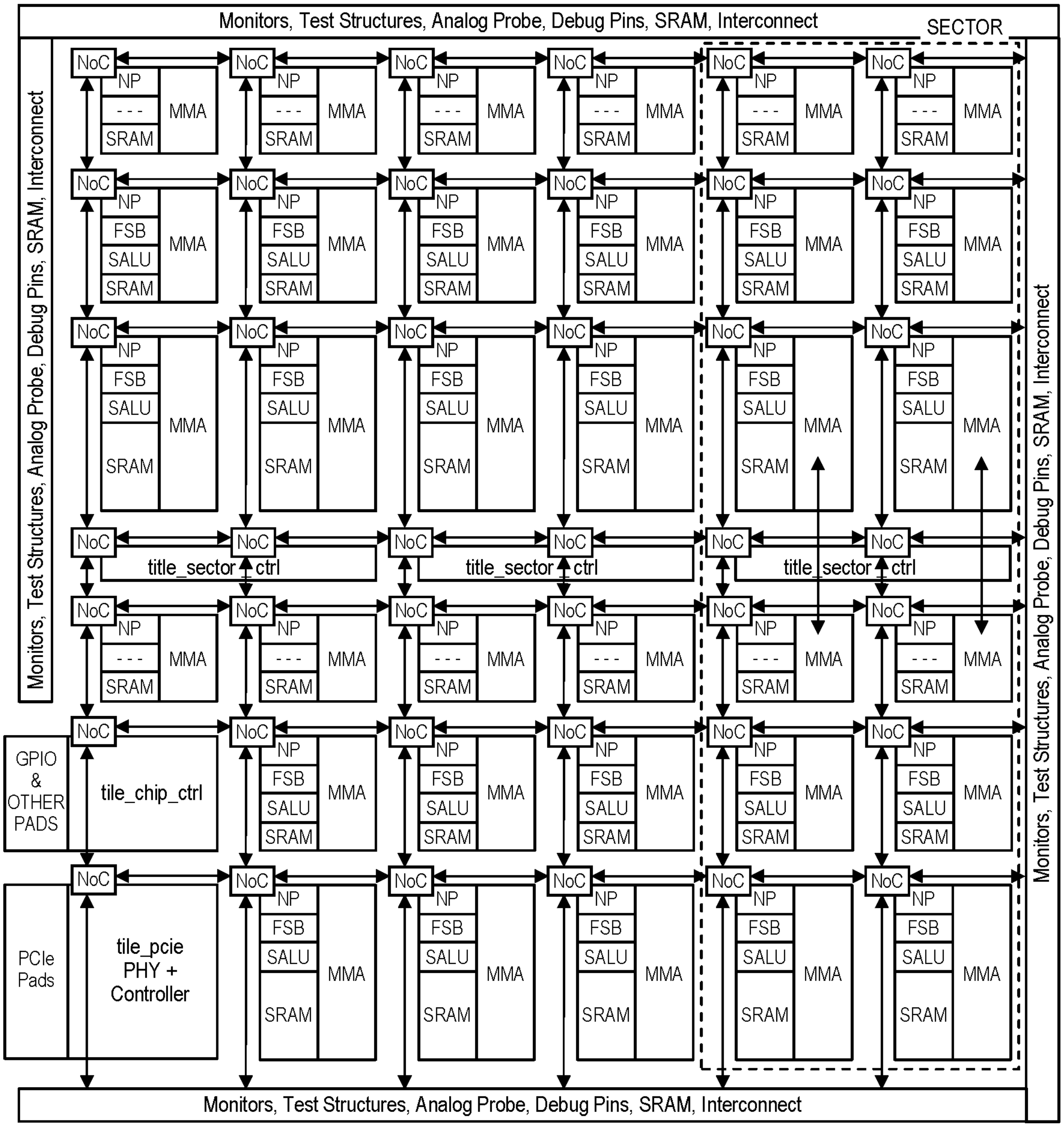

As shown in FIGS. 1-1A, an intelligence processing computing architecture 100 (or alternately referred to herein as an intelligence processing integrated circuit 100) for processing computationally-intensive programs and/or applications (e.g., machine learning applications, neural networks, etc.) includes an intelligence processing array 105 that includes a plurality of intelligence (computing) processing (tiles) units 110, a network on chip system 120 that includes a plurality of network-on-chip routers 125, an integrated circuit controller circuit 130, tile sector controller circuit 140, and a serial connection bus 150. Preferably, each of the plurality of intelligence processing units 110 includes a matrix multiply accelerator 111 (may also be referred to herein as an accelerator circuit), a computer processing circuit (e.g., a microprocessor, a nano-processor, or the like) 112, a flow scoreboard (token-based governance) module 114, a single instruction multiple data (SIMD) unit 116 (e.g., streaming arithmetic logic unit or the like), and a local buffer (e.g., static random access memory (SRAM) or the like) 118. In some embodiments, a local data buffer 118 may be implemented by an SRAM controller that may include, at least, a SRAM storage or circuit, one or more data transfer engines or circuits (e.g., a DMA controller) that may be used to move data to and/or from the SRAM and other computing resources, an arbitration scheme that selects which controller has access to the SRAM at a given time. Additionally, in one preferred embodiment, each of 130, 140, and 150 may include a computer processing circuit 112, a flow scoreboard module 114, a SIMD 116, and a local data buffer 118. In one or more embodiments, the local data buffer 118 may sometimes be referred to herein as an on-tile memory or on-tile buffer indicating that the local data buffer 118 may be arranged within an intelligence processing tile 110 and in direct communication with various or one or more circuits, components, and/or modules within the intelligence processing tile 110. FIG. 1A includes a further detailed embodiment of the intelligence processing computing architecture 100 and includes additional peripheral interconnects for interfacing with the intelligence processing array 105. For instance, test structures, monitors, analog probes, and/or any suitable peripheral device may be connected along or arranged along the periphery of the intelligence processing array 105 of the intelligence processing computing architecture 100.

While in one or more preferred embodiments an intelligence processing unit 110 may include a matrix multiply accelerator 111, a computer processing circuit 112, a flow scoreboard module 114, a SIMD unit 116, and a local buffer 118, it shall be noted that an intelligence processing unit 110 may include any suitable combination of circuits and modules and therefore, may exclude one or more of the aforementioned circuits and modules and/or may include any combination of the aforementioned circuits and modules without meaningfully departing from the scope of the inventions described in the present application. For instance, in some embodiments, an intelligence processing unit 110 may include or consist of a flow scoreboard module 114 and a local buffer 118 (SRAM) without computational circuitry or the like (e.g., computer processing circuit 112). In another example, an intelligence processing unit 110 may include or consist of a flow scoreboard module 114, a local buffer 118 (SRAM), and an off-chip interface (e.g., USB, PCIe, HDMI, MIPI-CSI, I2C, ethernet, Bluetooth, and/or any suitable off-chip interface component).

Additionally, or alternatively, while processing within the architecture 100 may include analog processing components or the like, it shall be noted that the embodiments of the architecture 100 may also enable digital processing with any suitable circuitry including, but not limited to, embedded Field Programmable Gate Arrays (eFPGA), Systolic arrays, floating point units, and/or the like.

The intelligence processing array 105 (intelligence accelerator) preferably includes the plurality of distinct intelligence processing units 110 that may function to work in cooperation to execute a computationally-intensive application or the like. In some embodiments, the intelligence processing array 105 may function to define one or more intelligence processing pipelines that enables a processing of raw input data and/or data from an upstream device or process to a final output state. In such embodiment, each stage (e.g., by one or more disparate intelligence processing units 110 or the like) of the intelligence processing pipeline may be defined by a disparate intelligence processing unit 110 that may be specifically programmed to execute a fraction of an application or program. Each of the disparate intelligence processing units 110 of the intelligence processing array 105 preferably functions to operate or compute independently of other or heterogeneous intelligence processing units 110 within the intelligence processing array 105. Accordingly, because each stage of an intelligence processing pipeline may be configured with its own processing section (e.g., intelligence processing unit 110), each intelligence processing pipeline may function to processing input data independently along each stage within the pipeline thereby enabling considerable efficiencies in processing input. That is, asynchronous processing of data or raw input data may be achieved based on the independent processing and/or computations of respective intelligence processing units 110.

Additionally, or alternatively, each of the one or more intelligence processing pipelines defined within the intelligence processing array 105 may be flexibly configured to enable the execution of disparate (non-dependent) applications or programs within the single array 105 or flexibly configured to enable the execution of disparate sections of a single application or a single program along various intelligence processing units 110 within the array 105. For instance, a first neural network application may be programmed along a first section of the intelligence processing array 105 that includes a first collection of intelligence processing units 110 and a second neural network application may be programmed along a second section of the intelligence processing array 105 that includes a second disparate collection of intelligence processing units 110. In a second example, a single computationally-intensive application (e.g., a neural network or the like) may be partitioned into sub-applications (or programs) and each section programmed to a different intelligence processing unit 110 within an array 105. Additionally, or alternatively, in this second example, multiple sections of an application or multiple sub-applications may be programmed to a same intelligence processing unit 110. In yet another example, a plurality of intelligence processing units 110 may be conglomerated to perform one or more sub-sections of a single application or a single program. That is, individual intelligence processing units 110 may be used to implement only a section of an application or a program and thus, the entirety of the application or the program is handled by a plurality of intelligence processing units 110 that each process only a section of the overall application or program. It shall be noted that the integrated circuit array 105 and/or each intelligence processing units 100 may function to compute the multiple distinct applications and/or the multiple distinct partitions of a single application or single program in parallel (i.e., at the same time), contemporaneously (i.e., processing within a common time period, nearly the same time, etc.), or synchronously (i.e., processing independently of other processes and/or processing units 110). Additionally, it shall be noted that any suitable and/or type of application or program may be partitioned along the intelligence processing array 105 including applications and/or programs that may be partitioned into multiple operational stages that may have dependencies that can be represented as tokens.

The plurality of intelligence processing (tiles) units 110 preferably function to execute an application or a program against some input data received from an upstream device or an upstream layer, such as a buffer or another intelligence processing unit 110. As mentioned above, each of the plurality of intelligence processing units 110 includes a matrix multiply accelerator (e.g., a data processing circuit, or the like) 111, a computer processing circuit (e.g., a microprocessor) 112, a flow scoreboard module 114, a SIMD unit 116, and local data buffer 118 that enables each of the plurality of intelligence processing units 110 to accomplish and/or complete a processing of input data to output data and/or execute an application or program.

Each of the plurality of intelligence processing units 110 preferably functions to pull and/or accesses input data from its local buffer 118, compute against the input data at the matrix multiply accelerator (MMA) 111 and output the results (output data) of the computation against the input data back into its local buffer 118 (or possibly to a local buffer of a downstream component or processing section).

In additionally and/or alternative embodiments of the present application, one or more distinct subsets (i.e., two or more) of the plurality of intelligence processing units 110 of the intelligence array may be clustered and/or conglomerated into a smaller chip (e.g., a chiplet, a system-in-a-package (SIP), 3D packaging, or the like) relative to the overall architecture 100. In such embodiments, a chiplet may be composed within the overall architecture 100 to make a full and/or independent chip. A technical benefit of such embodiments enables an enhanced level of customization of the architecture to be achieved.

In yet further embodiments, multiple integrated circuit architectures 100 may be combined and/or packaged together in a multi-chip architecture. In such embodiments, the multiple architectures 100 may be composed at a system or circuit board (panel) level. The interconnections between the multiple chips may be made using any suitable interconnect technique or interface, including PCIe or specially created bridge interfaces.

The flow scoreboard module 114 is preferably implemented by a combination of one or more computing processing circuits and flow scoreboard sub-modules. Additionally, the flow scoreboard module 114 may include a plurality of interfaces for implementing a flow control of data flowing through the one or more intelligence processing pipelines and a control of the execution of programs or the applications being handled by the one or more intelligence processing pipelines of the intelligence processing array 105.

In a preferred embodiment, the flow scoreboard module 114 may include a configuration interface, a token interface, and a notification interface. The configuration interface of the flow scoreboard 114 may be used to read and write an internal state of the flow scoreboard module 114, such as to program trigger conditions that when satisfied, in some embodiments, causes the integrated circuit via a nanoprocessor or the like to initiate a workload. The token interface of the flow scoreboard 114 may enable the intelligence integrated circuit 100 to present tokens to the flow scoreboard 114. In response to the presentation of a token via the token interface, the flow scoreboard 114 may function to update its internal state, and when necessary, update the notification interface according to token parameter values (e.g., token count values or the like, as discussed in further detail in the method 300) and a configuration of the flow scoreboard 114. The notification interface of the flow scoreboard may be implemented by the flow scoreboard module 114 to indicate to the intelligence integrated circuit 110 that one or more conditions (or prerequisites) for executing one or more programs have been satisfied. It shall be noted that the notification interface of the flow scoreboard module 114 may function to trigger any number of operations within the intelligence integrated circuit 110, for example, data transfer without an explicit program execution.

It shall be noted that the configuration interface, token interface, and/or notification interface may be implemented in any suitable manner including with a combination of modules executed by one or more processing circuits, such as a microprocessor.

The network on chip system 120 that includes a plurality of network-on-chip routers 125 that function to establish a communication network between the disparate components of the intelligence integrated circuit 100. In one embodiment, each of the chip routers 125 may include dedicated input and output links for receiving and transmitting communications in the North, South, East, and West directions along the architecture 100 and specifically, within the intelligence processing array 105. In some embodiments, the network on chip system 120 enables each of the disparate intelligence processing units 110 to pass data between them, such that when one intelligence processing unit 110 completes processing input data to generate an output, the one intelligence processing unit 110 may function to pass the output via one or more of the network routers of the network on chip system to another intelligence processing unit and/or allow another intelligence processing unit 110 to grab the output data. As one example, the digital tokens and/or data packets may be carried along the plurality of network routers of the network on chip system 120.

The integrated circuit controller 130 preferably includes chip-level control logic, which includes boot logic, security features, clocking logic, and the like.

The tile sector controller circuit 140 preferably includes a high voltage portion or circuit of the intelligence processing computing architecture 100 that enables the reprogrammable non-volatile memories within the matrix multiply accelerator 111.

The serial connection bus 150 preferably includes one of a universal serial bus (USB) port and a peripheral component interconnect express (PCI express) interface and/or any suitable high-speed. In a preferred embodiment, raw input data (e.g., raw image data or the like) and/or processed input data (e.g., from an upstream device, an upstream layer, etc.) may be received at the serial connection bus 150 and passed into the system via a primary or main buffer component. Additionally, or alternatively, input data received at the serial connection bus 150 may be passed either into a primary buffer of the intelligence processing integrated circuit 100 or directly into a local buffer 118 of an intelligence processing unit 100 via the network on chip system 120. Additionally, or alternatively, the primary buffer, which is sometimes referred to herein as a main buffer, may also be referred to as an off-tile (off-unit) memory or buffer. In particular, since the main buffer operating with the architecture 100 may be arranged remotely from and off of an intelligence processing tile 110, it may be considered an off-tile component.

Additionally, or alternatively, any suitable off-chip connection may be implemented for transmitting data into and/or out of an intelligence processing array 105 and/or throughout the intelligence integrated circuit 100. For instance, any suitable peripheral device including, but not limited to, an imaging device (e.g., a camera or image sensor), a host system (e.g., a system on chip) or workstation, another intelligence integrated circuit, and/or the like.

Accordingly, it shall be noted that any type or kind of data including tokens may be passed along the serial connection bus 150 or other suitable off-chip connection/interface. For instance, data (e.g., results of computations or other outputs, etc.) from the intelligence integrated circuit 100 may be sent out to another device or system via the serial connection bus 150 or off-chip connection. Thus, a flow control, as described in the one or more embodiments herein, may be extended from the intelligence integrated circuit 100 to other devices, when operably connected or interfacing, in some manner. That is, in some embodiments, token-based flow control may be enabled between multiple intelligence integrated circuits 100 or between a device and host.

Additionally, or alternatively, the artificial neural network training techniques described herein may be specifically configured to generate neural network parameters that are optimized for execution on the intelligence processing computing architecture 100. For example, the weight scaling techniques, output scaling techniques, and node folding techniques described herein may produce neural network parameters that operate within preferred signal ranges of the matrix multiply accelerator 111 and associated arithmetic logic units of the integrated circuit. Accordingly, the training process may generate neural network parameters that improve signal-to-noise ratio, reduce clipping of signals, and increase computational efficiency when the trained neural network is executed on the intelligence processing computing architecture 100.

3. A Method for Intelligently Training an Artificial Neural Network

Figure 2:
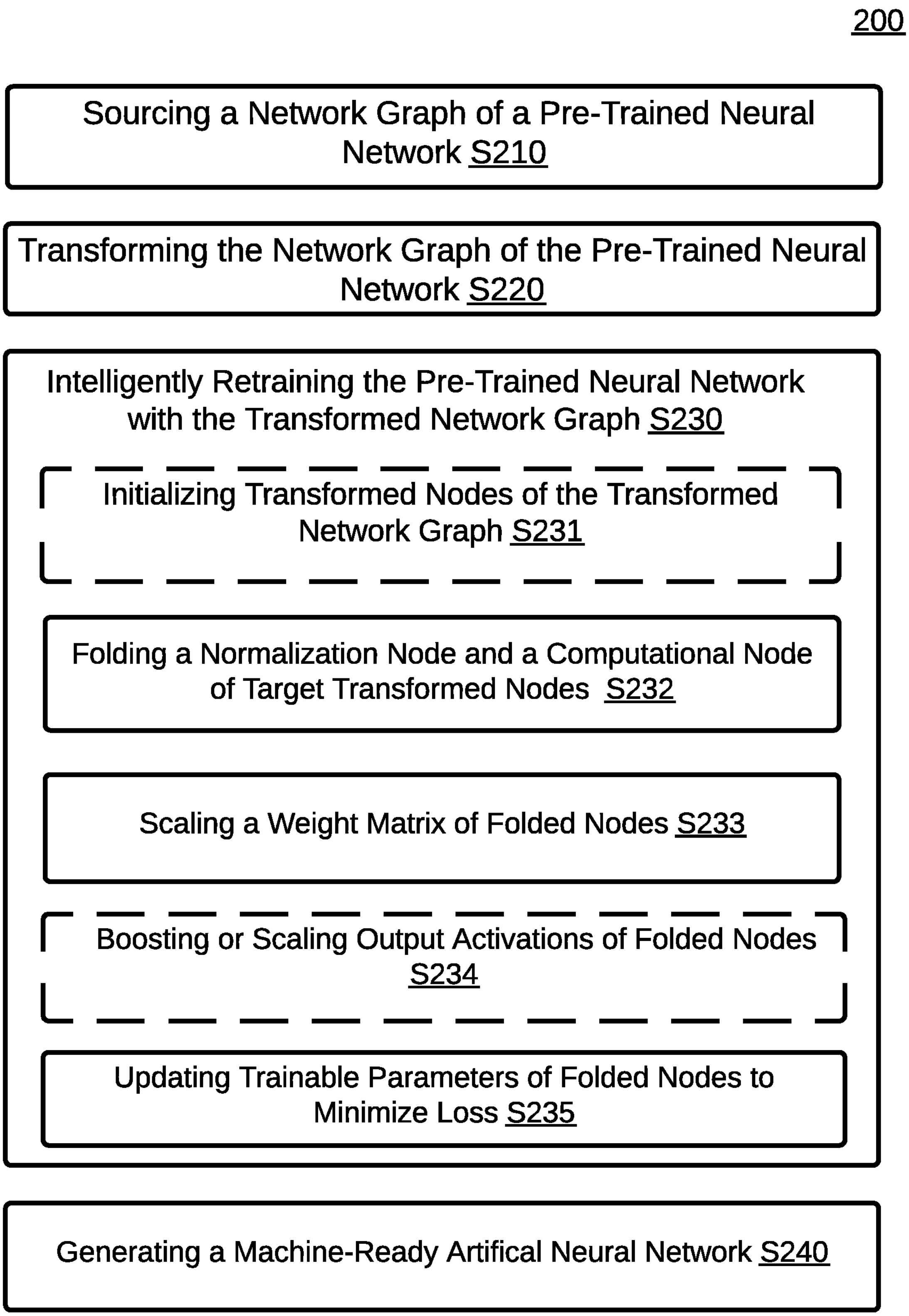
FIG. 2 illustrates an example method in accordance with one or more embodiments of the present application.

As shown in FIG. 2, the method 200 for intelligently training an artificial neural network may include sourcing a network graph of a pre-trained artificial neural network S210, transforming the network graph of the pre-trained artificial neural network S220, intelligently retraining the pre-trained artificial neural network with a transformed network graph S230, and generating a machine-ready artificial neural network S240.

It shall be noted that for one or more steps of the method 200, reference is made to U.S. Patent Application No. 63/230,538, filed on 6 Aug. 2021, titled SYSTEMS AND METHODS FOR INTELLIGENTLY TRAINING AN ARTIFICAL NEURAL NETWORK FOR A MIXED-SIGNAL INTEGRATED CIRCUIT, which is incorporated herein in its entirety by this reference.

3.10 Sourcing a Network Graph of a Pre-Trained Artificial Neural Network

S210, which includes sourcing a network graph of a pre-trained artificial neural network, may function to receive a network graph or construct a network graph of a target artificial neural network identified for re-training on a training platform. In one or more preferred embodiments, a network graph of a pre-trained artificial neural network may include a plurality of nodes and a plurality of edges that may identify the points of connections and operations of the pre-trained artificial neural network (e.g., a flow of input and outputs of data between nodes, a computational flow of input and execution tasks along the computational flow).

It shall be noted that in one or more embodiments, nodes of a network graph may represent distinct network operations (e.g., distinct layers, distinct activation functions, etc.) and edges of a network graph may represent dependencies between nodes (e.g., inputs and outputs from nodes between distinct network operations). It shall be further noted that the network graph, in some embodiments, may be described and/or generated in any suitable data structure or language (e.g., an Open Neural Network Exchange (ONNX) format).

In operation, S210 may function to source a network graph of a pre-trained artificial neural network having learned parameters (e.g., weights and/or biases) in a floating-point precision of thirty-two bits (FP32). Accordingly, the graphical structure of a sourced network graph (of a pre-trained artificial neural) may take a variety of architectural forms, including but not limited to the below architectural examples.

Sourcing a Network Graph Absent of Normalization Nodes

Figure 3:
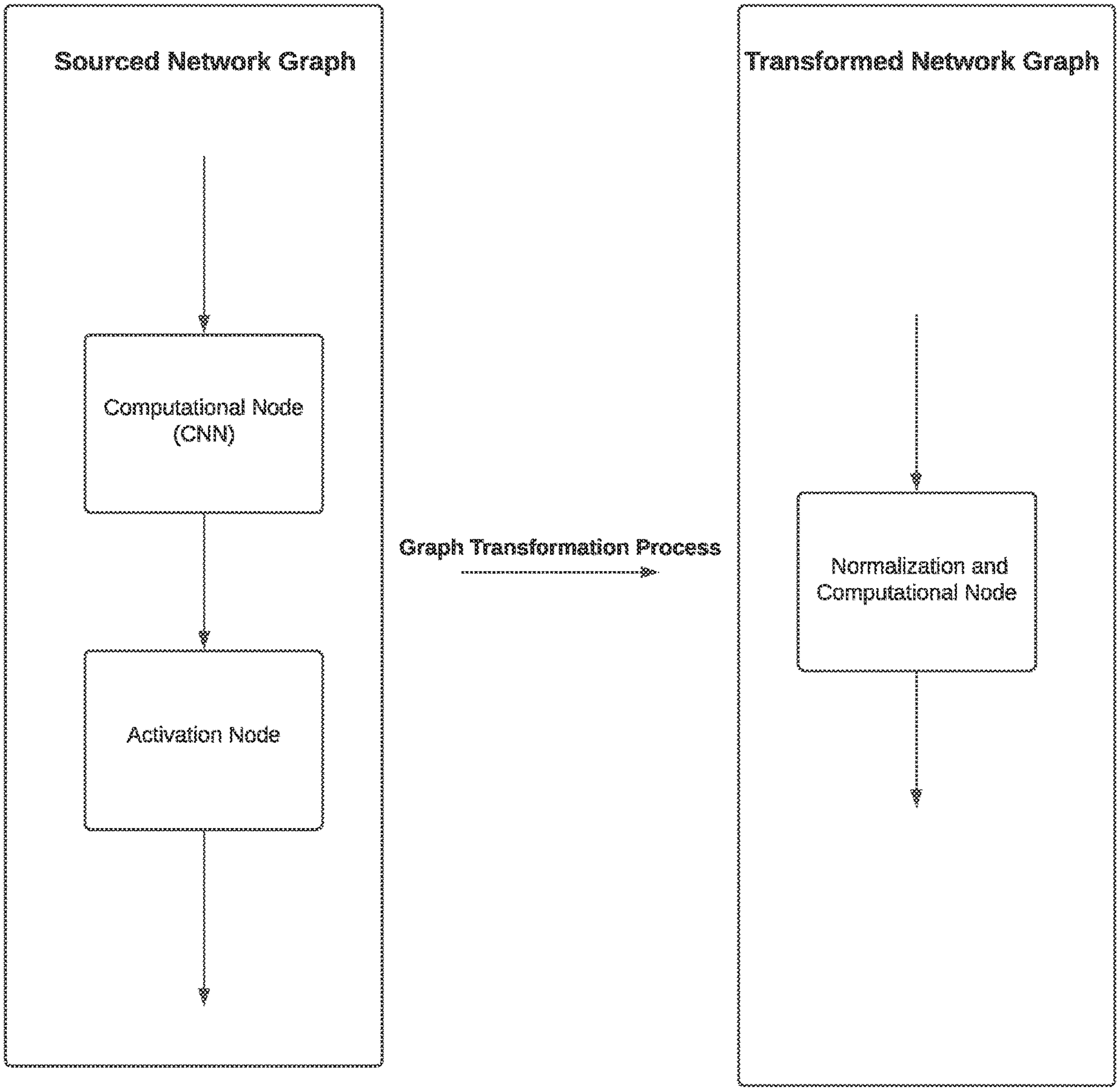
FIG. 3 illustrates an example schematic of a network graph and a transformed network graph in accordance with one or more embodiments of the present application.

In one or more embodiments, S210 may function to source a network graph of a pre-trained artificial neural network that may generally be in a first graphical structure, as shown generally by way of example in FIG. 3. In such embodiments, one or more portions of the sourced network graph may generally include an input edge flowing into a computational node and an output edge extending from the computational node and into an activation node to compute an output (e.g., input->computational node->activation node->output). In other words, a computational flow for at least a portion of a network graph in a first graphical structure may generally be structured in such a way that computational inputs (e.g., computational input edges) may be directly passed or fed into a computational node (e.g., a convolutional node, a liner node, etc.) and the outputs of the computational node may be directly passed to an activation node.

Accordingly, in such embodiments, a pre-trained artificial neural network in a first graphical structure may generally be absent of distinct normalization nodes preceding or succeeding a computational node (e.g., a convolutional node, a linear node, etc.).

Sourcing a Network Graph with Batch Normalization Nodes Preceding Computational Nodes In one or more embodiments, S210 may function to source a network graph of a pre-trained artificial neural network in a second graphical structure (e.g., input->batch normalization node->computational node->activation node->output). In such embodiments, an exemplary node arrangement and data flow sequence for one or more portions of the network graph of the pre-trained artificial neural network may generally include a batch normalization node (e.g., a normalization node, a batch normalization layer) that may be configured to receive input data passed from an upstream node of a network graph and the output of the batch normalization node may be passed to a computational node (e.g., a linear node, a convolutional node, a liner layer etc.). Accordingly, the output of the computational node may be passed to an activation node. In other words, in such graphical node arrangement and data flow sequence for one or more portions of a network graph in a second graphical structure, the batch normalization nodes may function to normalize input data into downstream computational nodes, as shown generally by way of example in FIG. 4 and FIG. 5.

In particular and during a training flow, a target batch normalization node may function to normalize each batch of training data passed to a batch normalization node using the expression $$x' = \frac{(x-\mu)}{\sigma} * \gamma + \beta,$$

where x' is the normalized sample of the input, x is the sample of the input, μ is the mean of the input distribution, σ is the standard deviation of the input distribution, γ may be optional and is a learned scale parameter, and β may be optional and is a learned offset parameter.

It shall be noted that, in embodiments, in which a batch normalization node (e.g., batch normalization layer) occurs before a computational node (e.g., a computational layer), an accelerator (e.g., a modeled matrix multiply accelerator of the training platform) may perform weighted sum calculations using normalized inputs (e.g., x').

Sourcing a Network Graph with Batch Normalization Nodes Succeeding Computational Nodes In one or more embodiments, S210 may function to source a network graph of a pre-trained artificial neural network in a third graphical structure (e.g., input->computational node->batch normalization node->activation node->output). In such embodiments, an exemplary node arrangement and data flow sequence for one or more portions of the network graph of the sourced artificial neural network may be that a computational node may be configured to receive input data passed from an upstream node, and the output of the computational node may be passed to a batch normalization node, and the output of the batch normalization node may be passed to an activation node.

Figure 6:
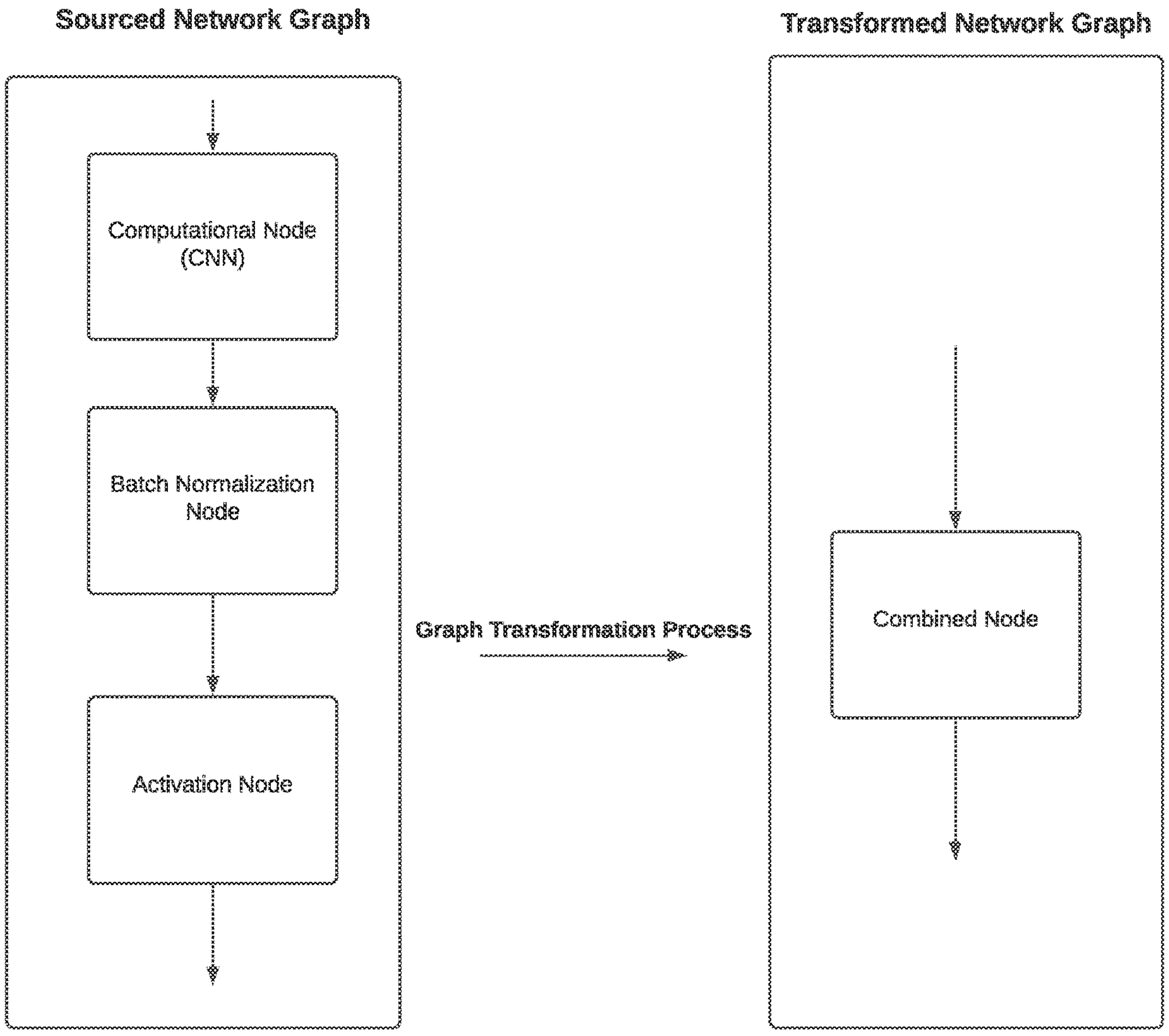
FIG. 6 illustrates an example schematic of a network graph and a transformed network graph in accordance with one or more embodiments of the present application.
Figure 7:
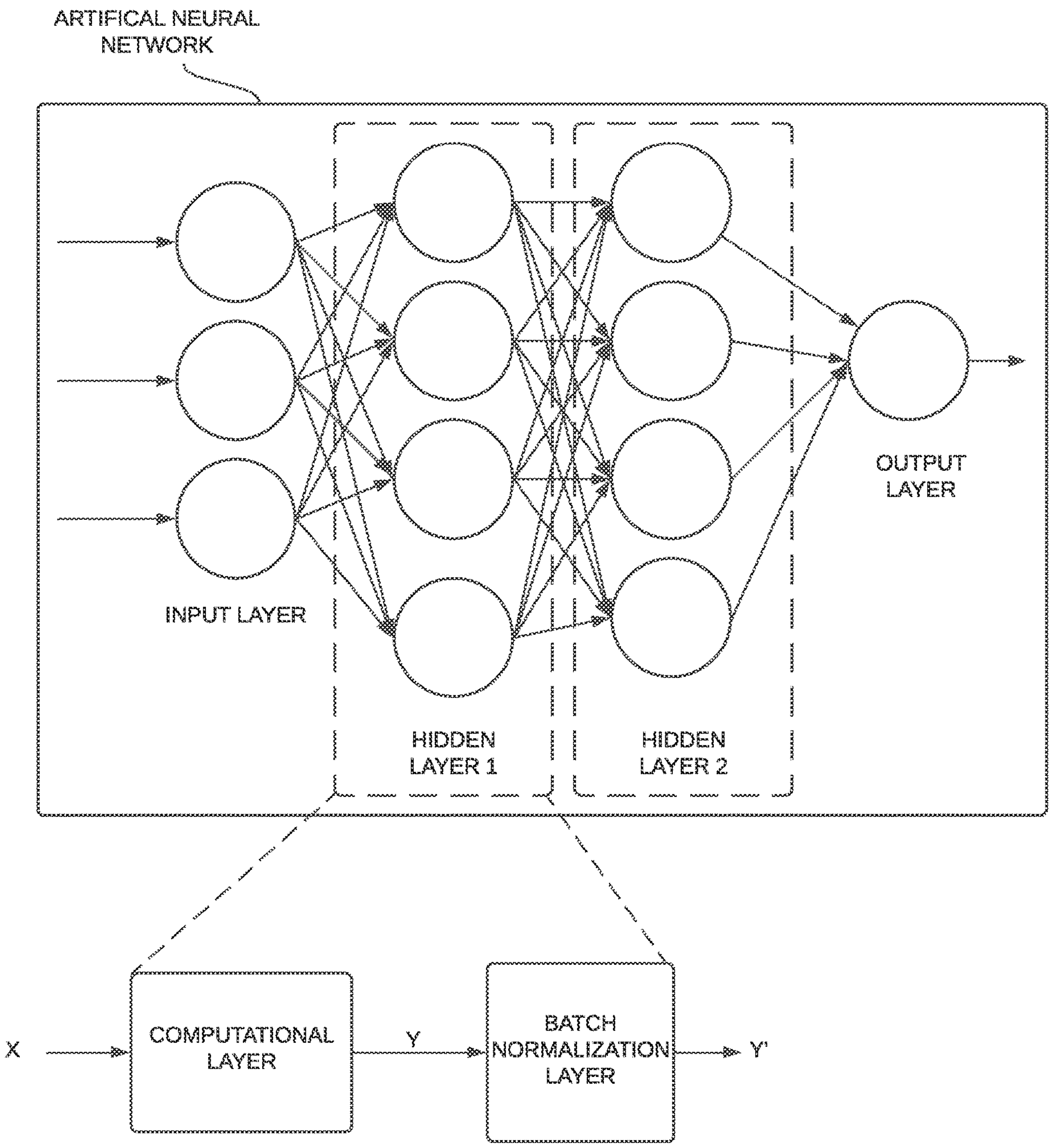
FIG. 7 illustrates an example schematic of a pre-folded computational layer before a pre-folded batch normalization layer implementing portions of the method 200.

In other words, in such graphical node arrangement and data flow sequence, a target batch normalization node (e.g., a target batch normalization layer) may function to normalize output data of a target computational node (e.g., a target computational layer), as shown generally by way of example in FIG. 6 and FIG. 7.

In operation, a target batch normalization node downstream of a target computational node may normalize output data computed by a computational node by normalizing output data (e.g., output activations) of the target computational node using the expression $$y' = \frac{(y-\mu)}{\sigma} * \gamma + \beta,$$

where y' is the normalized sample of the output, * is a convolutional operation, y is the sample of the output, μ is the mean of the output distribution, σ is the standard deviation of the output distribution, γ may be optional and is a learnable scale parameter, and β may be optional and is a learnable offset parameter.

It shall be noted that, in embodiments, in which a batch normalization node occurs after a computational node of a sourced artificial neural network, a modeled accelerator of a training platform (e.g., a matrix multiply accelerator) may perform weighted sum calculations and a batch normalization layer downstream of the computational layer may normalize the output activations of the computational layer.

It shall be further noted that in embodiments in which S210 sources a network graph of a pre-trained artificial neural network comprising one or more normalization nodes (e.g., normalization layers), S210 may function to fold each of the normalization nodes (e.g., the normalization layers) into target computational nodes (or target computational layers) to transform a sourced network graph of an artificial neural network into a preferred network graph architecture state.

Additional Graph Transformations

In some embodiments, transforming the network graph may further include identifying activation nodes that follow computational nodes and grouping the activation operations with system-generated nodes of the transformed network graph. In such embodiments, an activation function that follows a computational node may be removed as a standalone node within the network graph and instead stored as an attribute associated with the system-generated node. For instance, when a computational node is replaced by a system-generated node (e.g., a Signal-to-Noise Ratio (SNR) node), an activation function associated with the computational node may be stored as metadata or an attribute of the SNR node. Accordingly, the SNR node may execute the activation operation as part of the execution pipeline of the node.

In some embodiments, storing the activation function as an attribute of the SNR node may enable the system to consolidate multiple operations into a single executable unit within the transformed network graph. This consolidation may reduce the number of nodes in the transformed network graph and improve computational efficiency during training and deployment. In additional embodiments, the transformed network graph may include additional nodes that represent hardware modeling parameters. For example, a global hardware parameter node may be inserted into the graph to provide hardware-specific parameters (e.g., temperature parameters, noise parameters, or drift parameters) to one or more SNR nodes.

3.20 Transforming a Network Graph of a Pre-Trained Neural Network

S220, which includes transforming a network graph of a pre-trained neural network, may function to transform one or more portions of a network graph of a pre-trained neural network by executing one or more intelligent graph transformation operations. In one or more preferred embodiments, in response to S210 sourcing a network graph of a pre-trained neural network, S220 may function to intelligently transform one or more portions of the network graph according to one or more graph transformation heuristics.

Figure 4:
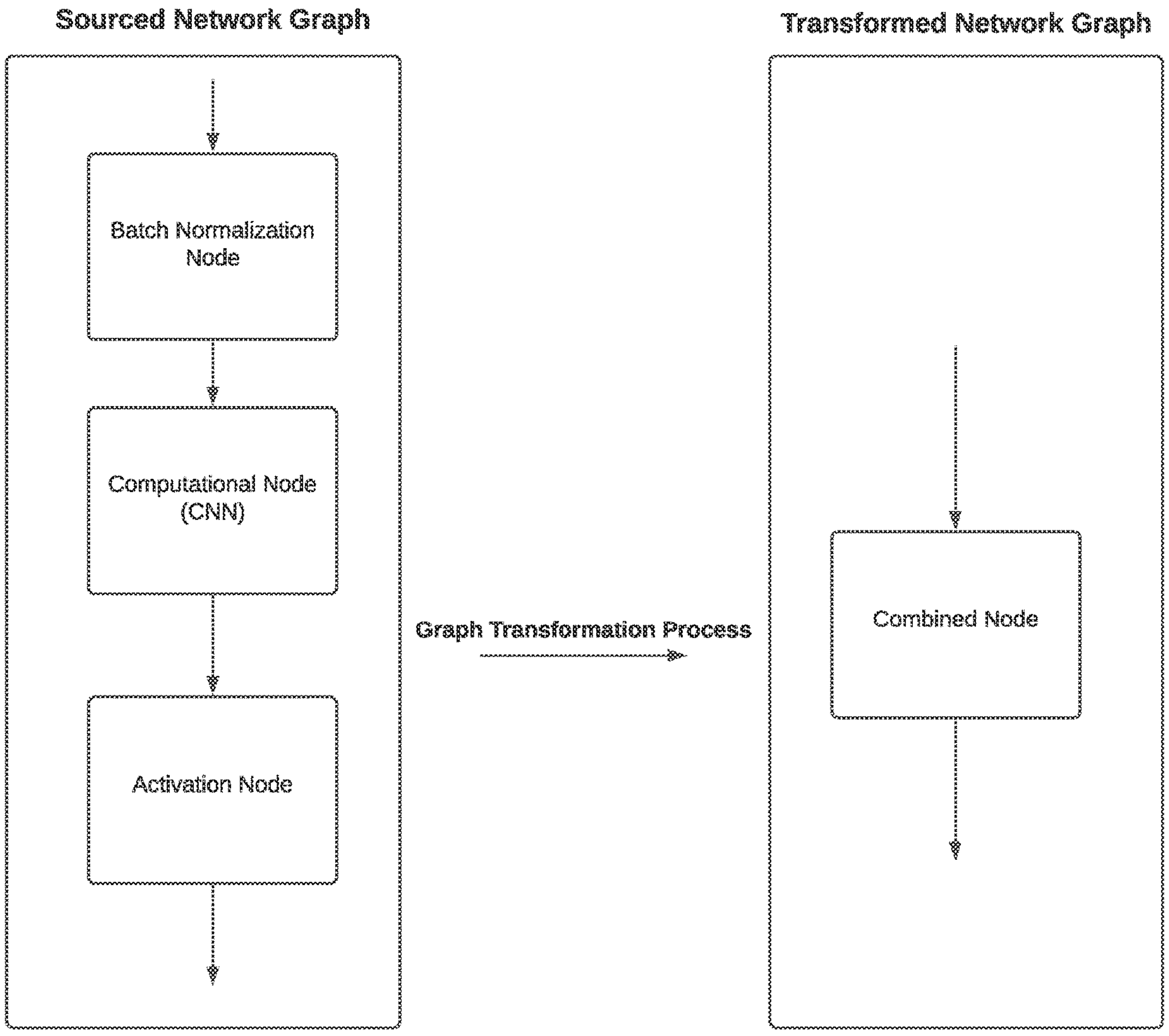
FIG. 4 illustrates an example schematic of a network graph and a transformed network graph in accordance with one or more embodiments of the present application.
Figure 5:
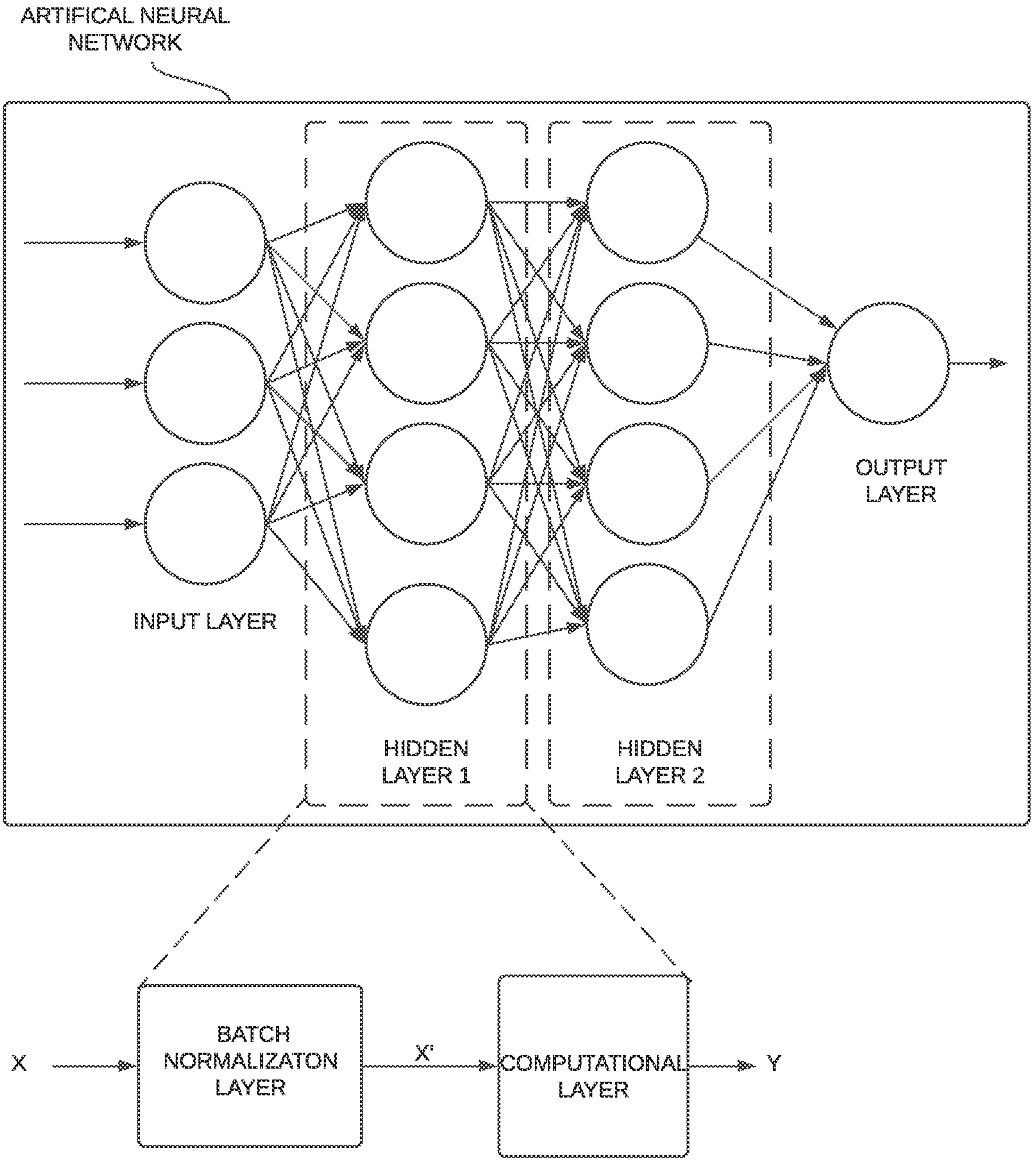
FIG. 5 illustrates an example schematic of a pre-folded batch normalization layer before a pre-folded computational layer implementing portions of the method 200.

It shall be noted that transforming a network graph of a pre-trained neural network may occur before retraining of a pre-trained artificial neural network, as shown generally by way of example in FIG. 3, FIG. 4, and FIG. 6.

Replacing Computational Nodes of a Sourced Network Graph

In one or more embodiments, S220 may function to (e.g., automatically) inspect a network graph of a pre-trained neural network in response to a sourcing of a network graph as described in S210. In such embodiments, S220 may function to detect that a sourced network graph of S210 may be absent of normalization nodes and may include a plurality of computational nodes (e.g., convolutional nodes, linear nodes, etc.).

Figure 8:
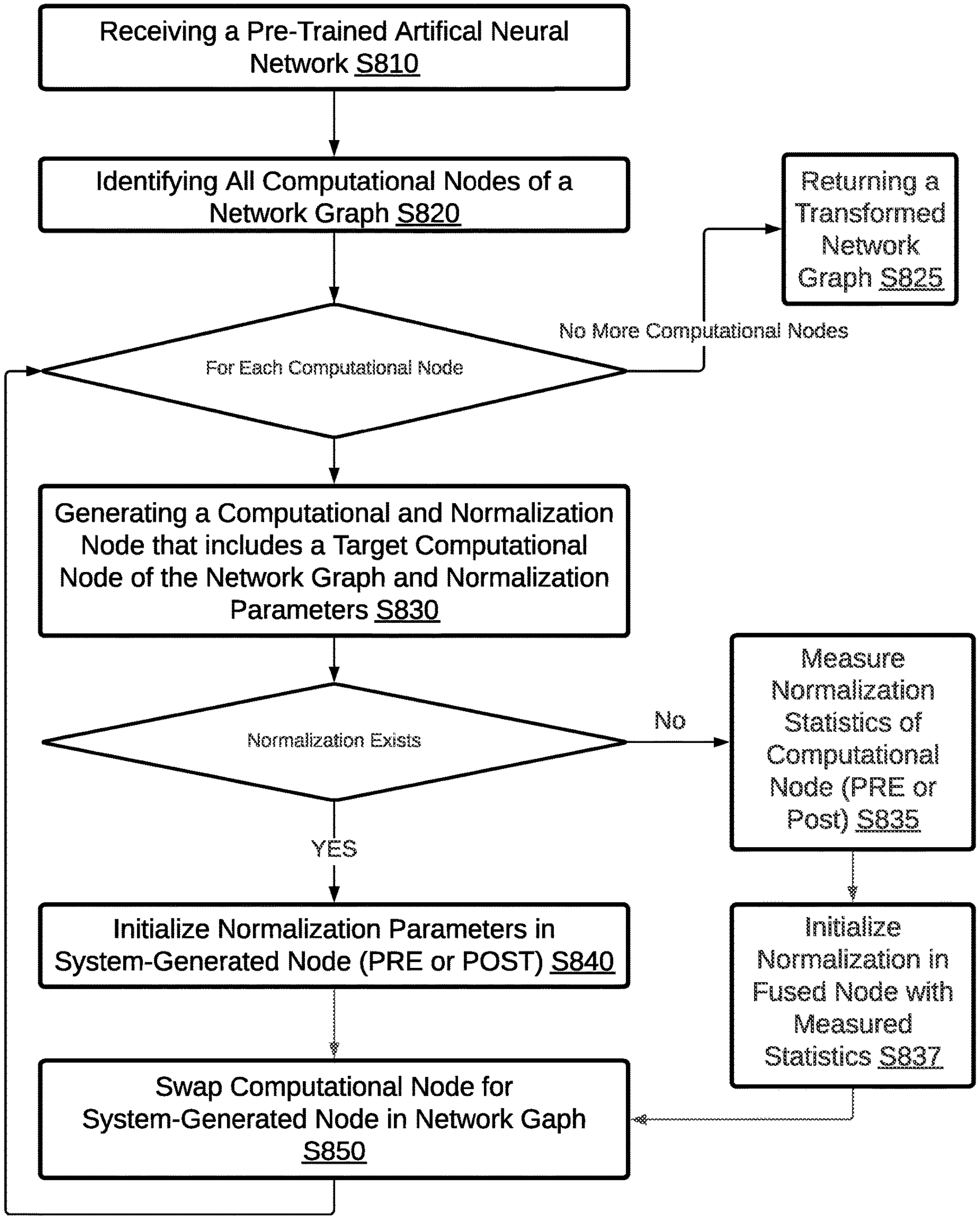
FIG. 8 illustrates an example process flow of transforming a sourced network graph implementing portions of the method 200.

In operation, in response to such detection, S220 may function to identify each computational node (e.g., each convolutional node, each linear node) associated with the sourced network graph and replace each computational node of the sourced network graph with a system-generated node (e.g., a Signal-to-Noise Ratio (SNR) Node, a specialized multi-purpose node) that includes both normalization operations (e.g., batch normalization operations $$\left(\text{e.g., } \frac{(x-\mu)}{\sqrt{\sigma^2+\epsilon}} * \gamma + \beta\right)\Bigg)$$

and the computational operations of the replaced computational node, as shown generally by way of example in FIG. 8. In other words, S220 may function to intelligently replace each computational node in the original network graph with a system-generated node that performs both computational operations of the original computational node and additionally batch normalization operations.

In one or more embodiments, as shown in FIG. 8, a method for transforming a network graph of a pre-trained artificial neural network is illustrated, wherein the method of FIG. 8 provides a detailed implementation of the transformation step S220 of method 200 described in FIG. 2. In particular, following sourcing of a network graph of a pre-trained artificial neural network (S210), the transformation step (S220) may include receiving a pre-trained artificial neural network (S810) and identifying all computational nodes of a network graph associated with the pre-trained artificial neural network (S820). The method may include iterating through each computational node of the network graph and, for each computational node, generating a system-generated node that comprises computational operations corresponding to a target computational node and normalization parameters (S830).

The method may further include determining whether normalization parameters exist for the target computational node. In response to determining that normalization parameters do not exist, the method may include measuring normalization statistics of the computational node based on pre-normalization or post-normalization data (S835) and initializing normalization parameters of the system-generated node based on the measured normalization statistics (S837). In response to determining that normalization parameters exist, the method may include initializing normalization parameters of the system-generated node based on existing normalization parameters (S840). The method may further include replacing the computational node in the network graph with the system-generated node (S850).

The method may include determining whether additional computational nodes remain in the network graph, and in response to determining that no additional computational nodes remain, returning a transformed network graph, which corresponds to the transformed network graph used in the retraining step S230 of method 200. Accordingly, FIG. 8 illustrates a detailed node-level implementation of transforming the network graph in step S220 of method 200.

It shall be noted that in one or more embodiments, the batch normalization operations and the computational operations of a system-generated node may be distinct operations (e.g., a normalization operation occurring before a computational operation, a computational operation occurring before a normalization operation). Thus, in one or more embodiments, each system-generated node of a network graph may have a distinct weight matrix (y) and a distinct bias matrix (B) associated with a batch normalization operation and a distinct weight matrix (W) and a distinct bias (b) matrix associated with a computational operation.

Grouping of Network Graph Nodes

In one or more embodiments, S220 may function to (e.g., automatically) inspect a network graph of a pre-trained neural network in response to a sourcing of a network graph as described in S210. In such embodiments, S220 may function to detect that a computational flow for one or more portions of a sourced network graph of S210 may include a computational node and a normalization node (e.g., directly) succeeding a computational node. In other words, the output of a computational node may be (e.g., directly) passed to a normalization node.

Accordingly, in response to such detection, S220 may function to transform the sourced network graph by grouping the computational node (e.g., the convolutional node, the linear node) and the normalization node (e.g., the batch normalization node) into a common node (e.g., a grouped node, a shared node).

In another example, S220 may function to (e.g., automatically) inspect a network graph of a pre-trained neural network in response to a sourcing of a network graph as described in S210. In such example, S220 may function to detect that a computational flow of a sourced network graph for one or more portions of the network graph may include a normalization node and a computational node (e.g., directly) preceding a normalization node. In other words, the output of the computational node may be (e.g., directly) passed to a normalization node.

In response to such detection, S220 may function to transform the network graph by grouping the computational node (e.g., the convolutional node, the linear node) and the normalization node (e.g., the batch normalization node) into a shared node (or grouped node or common node).

At least one technical benefit of transforming the network graph from an original state sourced in S210 into a transformed network graph state may preferably provide a system implementing the method 200 a network graph in a preferred graphical state for re-training as will be further described below.

3.30 Intelligent Retraining of a Pre-Trained Neural Network with a Transformed Network Graph

S230, which includes intelligently retraining a pre-trained neural network, may function to retrain a pre-trained neural network on a training platform having a transformed network graph. In one or more embodiments, for each training iteration or epoch, S230 may include a plurality of training steps as shown generally by way of example in FIG. 9 and as described in more detail below.

Figure 9:
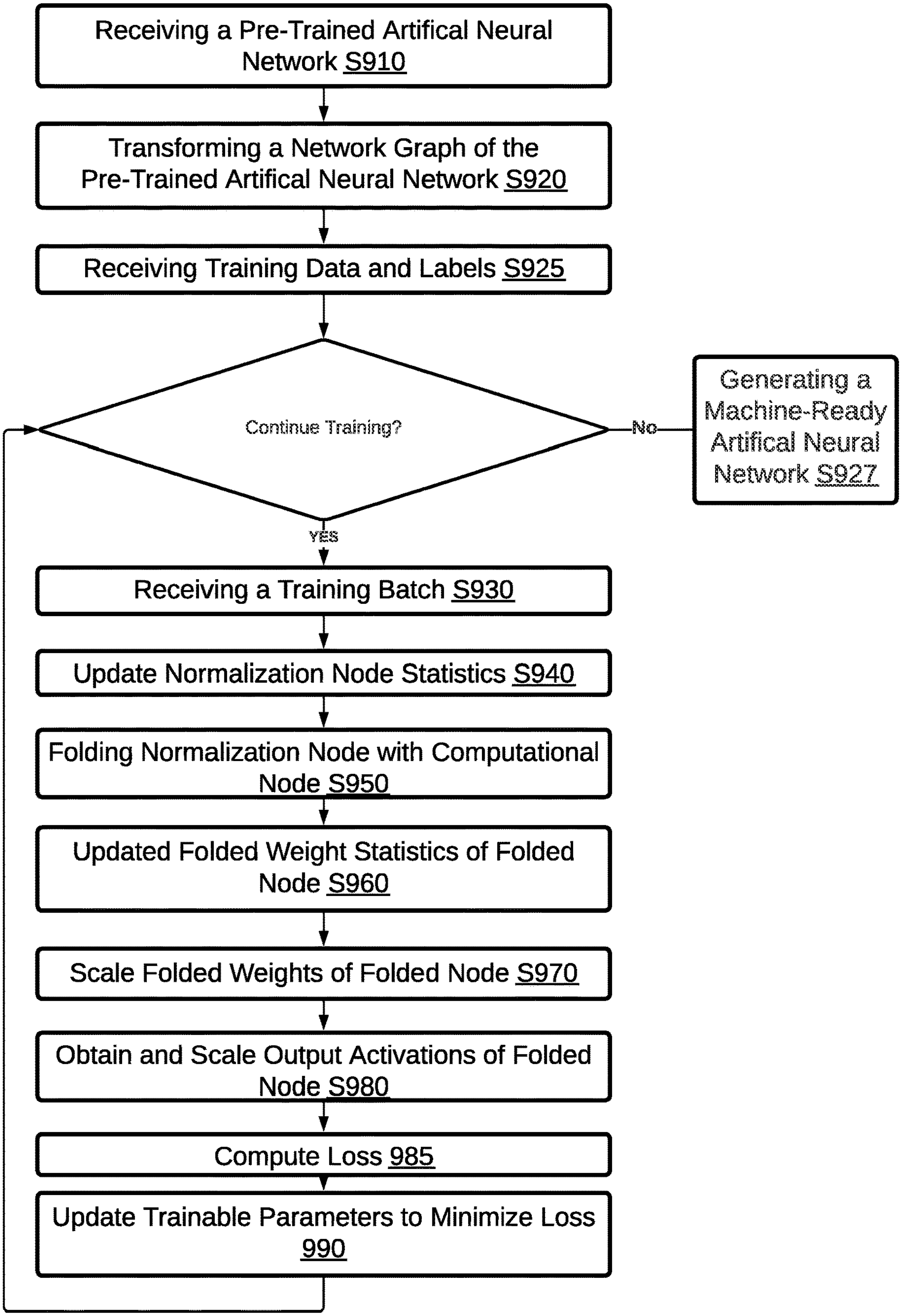
FIG. 9 illustrates an example process flow of retraining a pre-trained artificial neural network implementing portions of the method 200.

In one or more embodiments, as shown in FIG. 9, a method for retraining a pre-trained artificial neural network using a transformed network graph is illustrated, wherein the method of FIG. 9 provides a detailed implementation of the retraining step S230 of method 200 described in FIG. 2. In particular, following transformation of the network graph (S220), the retraining step (S230) may include receiving a pre-trained artificial neural network (S910), transforming a network graph of the pre-trained artificial neural network (S920), and receiving training data and corresponding labels (S925).

The method may include determining whether to continue training, and in response to determining that training should continue, receiving a training batch (S930). The method may further include updating normalization node statistics (S940), which corresponds to initializing or updating transformed nodes (S231) of method 200, and folding a normalization node with a computational node to generate an integrated node (S950), which corresponds to folding step S232 of method 200. The method may further include updating folded weight statistics associated with the integrated node (S960) and scaling folded weights (S970), which correspond to scaling step S233 of method 200.

Additionally, the method may include obtaining and scaling output activations of the integrated node (S980), which corresponds to boosting or scaling output activations (S234) of method 200, computing a loss (S985), and updating trainable parameters to minimize the computed loss (S990), which corresponds to updating trainable parameters (S235) of method 200. In response to determining that training should not continue, the method may include generating a machine-ready artificial neural network (S927), which corresponds to generating a machine-ready artificial neural network (S240) of method 200.

Accordingly, FIG. 9 illustrates a detailed training loop implementation of the retraining step S230 of method 200, including parameter updates, normalization integration, and scaling operations performed during iterative training.

It shall be noted that for one or more of the below described training steps, S230 may preferably function on a per-batch basis to compute batch statistics (e.g., $\mu$ and $\sigma$ in a batch normalization operation) based on receiving a batch of training data.

3.31 Initializing System-Generated Nodes of a Transformed Network Graph

Optionally, S231, which includes initializing system-generated nodes of a transformed network graph, may function to intelligently initialize normalization parameters of each system-generated node associated with a transformed network graph. In one or more preferred embodiments, as pre-trained neural networks may be retrained using transformed network graphs, S231 may function to prevent accuracy degradation during a retraining of a pre-trained neural network by intelligently initializing system-generated nodes (e.g., a Signal-to-Noise Ratio (SNR) Node) implemented in a transformed network graph that replaces a computational node of an originally sourced network graph.

In other words, in embodiments in which S210 sources a network graph absent of normalization nodes and S220 functions to replace each computational node of the sourced network graph with a system-generated node (e.g., a Signal-to-Noise Ratio (SNR) Node) that performs both computational operations and normalization operations, S231 may function to intelligently initialize each system-generated node (e.g., each SNR node) to prevent a transformed network graph from experiencing accuracy degradation during a re-training. In such embodiments, S231 may function to initialize any batch normalization parameters of the system-generated node in such a manner to zero-out and/or cancel an effect of batch normalization within the system-generated node, at least during a pre-training calibration of the pre-trained artificial neural network.

It shall be noted that in embodiments in which the network graph of the pre-trained neural network sourced in S210 includes normalization nodes (e.g., batch normalization nodes), S231 may function to populate the normalization parameters of the sourced network graph into the normalization parameters of system-generated nodes.

Intelligent Initialization of Batch Normalization Parameters First Implementation In a first implementation, in embodiments in which S210 sources a network graph absent of batch normalization nodes and S220 functions to replace each computational node with a system-generated node (e.g., a Signal-to-Noise Ratio (SNR) Node) that may include batch normalization operations and computational operations, S231 may function to intelligently initialize one or more affine transformation parameters (e.g., $\gamma$ and $\beta$) associated with a batch normalization operation $$\left(\text{e.g., } \frac{(x-\mu)}{\sqrt{\sigma^2+\epsilon}} * \gamma + \beta\right)$$

of a system-generated node. In such embodiments, S231 may function to intelligently initialize one or more affine transformation parameters to be an inverse transform of computed batch statistics for a distinct number of training iterations (e.g., each training iteration may be associated with a distinct batch of training data).

In other words, S231 may function to initialize the batch normalization parameters (e.g., $\gamma$ and $\beta$) of a system-generated node in such a way that an input into a batch normalization node and an output of a batch normalization node may be equivalent.

In one or more embodiments of initializing each system-generated node implemented in a transformed network graph, S231 may function to intelligently configure one or more affine transformation parameters (e.g., $\gamma$ and $\beta$) of one or more batch normalization operation associated with a system-generated node to undo or be an inverse of computed batch statistics (e.g., $\mu$ and $\sigma$ of a batch (or batches) of training data) by initializing $\gamma=\sqrt{\sigma^2+\epsilon}$ and $\beta=\mu$ for a distinct number of training iterations. It shall be noted that over the distinct number of training iterations the affine transformation parameters (e.g., $\gamma$ and $\beta$) may remain constant (e.g., not backpropagating), while $\mu$ and $\sigma$ are updated on a per-batch basis to provide the artificial neural network enough time to intelligently learn the initial affine transformation parameter values without effecting network accuracy.

Accordingly, after completing a distinct number of training iterations (e.g., one (1) training iteration, two (2) training iterations, three (3) training iterations, four (4) training iterations, five (5) training iterations, etc.), S231 may function to allow the affine transformation parameters (e.g., $\gamma$ and $\beta$) to train with gradient descent (e.g., back propagation for adjusting weights of learnable parameters).

Intelligent Initialization of Batch Normalization Parameters-|Second Implementation Alternatively, in a second implementation, S231 may function to intelligently initialize learnable batch normalization parameters (e.g., $\gamma$ and $\beta$) and batch normalization statistics (e.g., $\mu$ and $\sigma$) in such a way that a distribution of output data of a batch normalization operation $$\left(\text{e.g., } \frac{(x-\mu)}{\sqrt{\sigma^2+\epsilon}} * \gamma + \beta\right)$$

may not be affected. substantially similar or equivalent to a distribution of input data passed to a batch normalization operation associated with each system-generated node.

In other words, the learnable batch normalization parameters and the batch statistics of each batch normalization operation of an implemented system-generated node may be initialized with $\mu=0$, $\sigma=1$, $\gamma=1$, and $\beta=0$ such that there may not be an effect on an output distribution of a computational layer of the pre-trained artificial neural network.

It shall be noted, however, that after an initial or first training iteration of the pre-trained artificial neural network, the batch normalization parameters may be updated to values of the true statistics of a target batch, which may cause an effect on the output distribution of a computational layer of the pre-trained artificial neural network.

Hardware-Aware Training for Mixed-Signal Accelerators

In some embodiments, the retraining of the artificial neural network may include modeling hardware characteristics associated with a target mixed-signal integrated circuit that may execute the trained neural network. In such embodiments, the training platform may simulate one or more analog or digital effects that may occur when executing the neural network on the mixed-signal integrated circuit. For example, the training platform may model analog artifacts that may occur within a matrix multiply accelerator (MMA) of the integrated circuit. Such artifacts may include weight programming variation, thermal drift of stored weights, stochastic analog noise, and other analog signal distortions.

In additional embodiments, the training platform may model digital effects associated with digital processing circuitry within the integrated circuit. For example, quantization effects, rounding errors, and multiply-shift approximation errors may be simulated during training. In some embodiments, the training process may include injecting simulated hardware noise into intermediate outputs of one or more nodes within the transformed network graph. Injecting simulated hardware noise during training may enable the artificial neural network to learn parameters that are robust to the analog and digital effects of the target hardware platform.

In some embodiments, the training platform may include separate models for analog processing units and digital processing units of the integrated circuit. For instance, an MMA hardware model may simulate analog computation artifacts while a digital arithmetic unit model may simulate quantization and rounding effects.

3.32 Folding Parameters of Normalization Nodes and Parameters of Computational Nodes to Generate One or More Folded (Integrated) Nodes

S232, which includes fusing and/or folding a pair of nodes of an artificial neural network on a per-batch basis, may function to fuse and/or fold the learnable parameters of a target normalization node with the learnable parameters of a target computational node to form an integrated node-pair during a training of the artificial neural network. Fusing or folding two or more nodes, as generally referred to herein, may include integrally combining the operations and/or normalization parameters of a normalization node with the operations and/or learnable parameters of a computational node into a single integrated node or an integrated node-pair (e.g., a folded node with a folded weight matrix and a folded bias matrix). In one or more preferred embodiments, S232 may function to fuse and/or fold the learnable parameters of a plurality of normalization nodes with the learnable parameters of a plurality of computational nodes of a group node and/or a system-generated node to generate a plurality of integrated node-pairs during training, respectively.

In operation, generating one or more integrated node-pairs (e.g., integrating and/or folding a target normalization node and a target computational node of a system-generated node or a grouped node) may generate new weights and new biases that may simulate the equivalent operations of both the pre-folded normalization node and the pre-folded computational node on a per-batch basis. In one or more embodiments, S232 may generate a fused node by folding and/or integrating a target pre-fused computational node and a target pre-fused normalization node together in any combination (e.g., a target pre-fused computational node before a pre-fused normalization node or a target pre-fused normalization node before a target pre-fused computational node).

It shall be noted that collapsing (e.g., fusing, folding, integrating) learnable parameters of a normalization node and learnable parameters of a computational node during training may generate an integrated node-pair (e.g., a weight-folded node) while retaining mathematical equivalence.

Weight Folding a Normalization Node into a Linear Node

Figure 10:
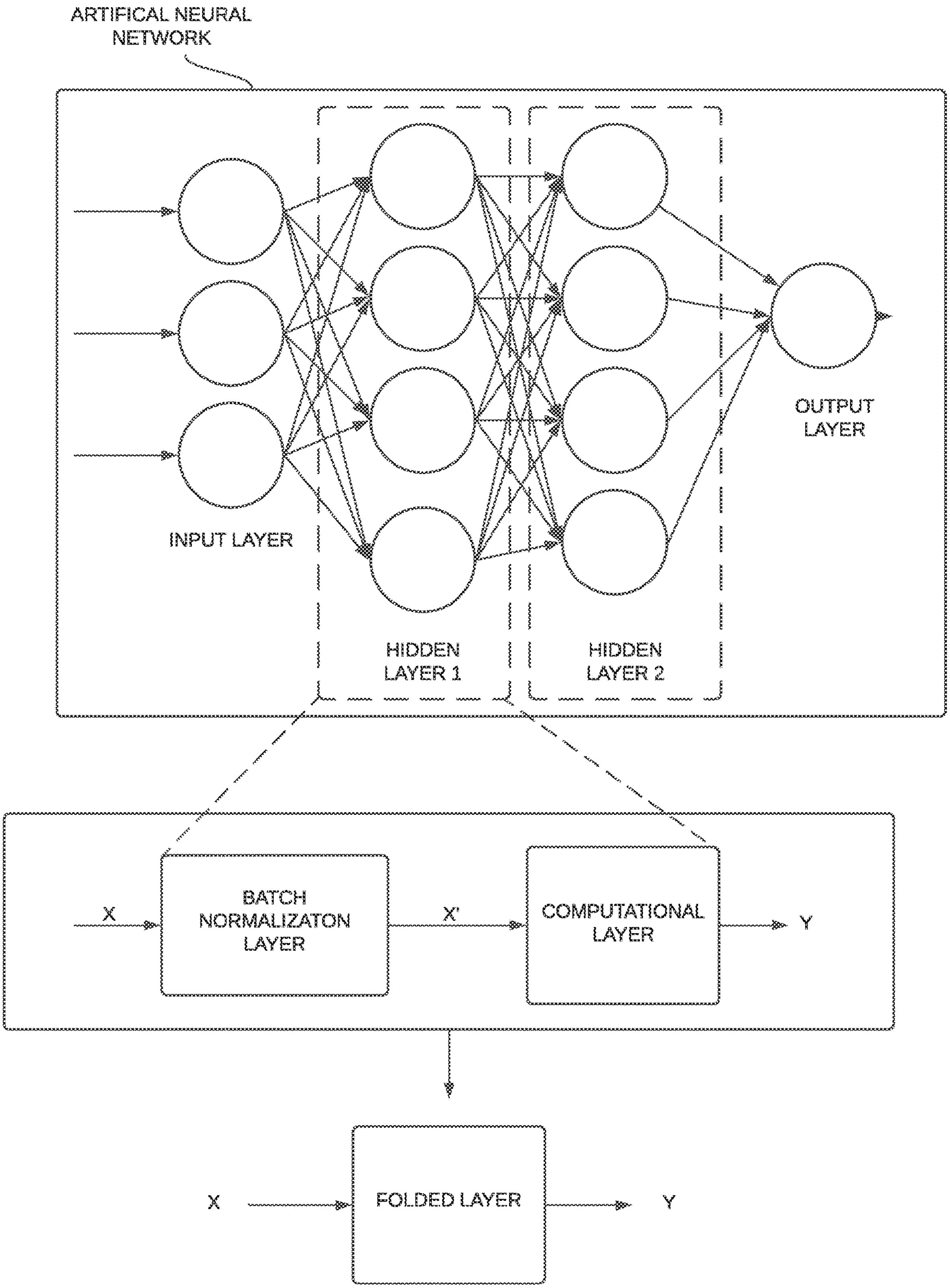
FIG. 10 illustrates an example schematic of folding a batch normalization layer into a computational normalization layer implementing portions of the method 200.

In a first implementation, S232 may function to fold learnable parameters of a target normalization node (e.g., a target batch normalization node) into a target linear node when the normalization node may be before or upstream of the target linear node, as shown generally by way of example in FIG. 10. In other words, S220 may function to integrate the operations of a target normalization node and the operations of a target downstream linear node on a per-batch basis.

In operation, a linear node of a transformed network graph of an artificial neural network may be configured to compute an output (y) by multiplying a weight matrix (W) by an input matrix (x) and adding a bias matrix (b) to the multiplication product thereof, which may be generally represented as $y=W^T*x+b$. As previously described in S210, the output of a batch normalization node implemented before a computational node may normalize layer input data, which may generally be represented by $$x' = \frac{(x-\mu)}{\sigma} * \gamma + \beta.$$

Therefore, inserting the normalized input (x') into the computation of the linear node yields, $$y = W^T * \left((x-\mu) * \frac{\gamma}{\sigma} + \beta\right) + b,$$

which may be mathematically rearranged to the expression $$y = W^T * \left(\frac{\gamma}{\sigma} * x\right) + W^T * \left(\beta - \mu\frac{\gamma}{\sigma}\right) + b.$$

It shall be noted that the rearranged expression similarly relates to the computation of the pre-folded linear node (e.g., $\gamma=W^T*x+b$).

Accordingly, referring to the rearranged expression, the folded operation of the folded node (e.g., integrated node-pair) may now be $y=W'^T*x+b'$, where the folded weight matrix may be $$W' + W \circ \frac{\gamma}{\sigma}$$

where ○ is the element-wise multiplication applied across the rows of the weight matrix and the folded bias matrix may be $$b' = b + W^T\left(\beta - \mu * \frac{\gamma}{\sigma}\right).$$

In other words, the folded weight matrix (W') and the folded bias matrix (b') of the integrated node-pair (e.g., folded layer) may include parameters of both the pre-folded batch normalization node and the pre-folded linear node.

It shall be noted that, in one or more embodiments, a plurality of integrated node-pairs may be generated for each node pair of a normalization node and a linear node of a grouped node and/or a system-generated node during a training of the artificial neural network.

Weight Folding a Normalization Node into a Convolutional Node Before a Dot Product In a second implementation, S232 may function to fold parameters of a target normalization node (e.g., a target batch normalization node) into a target convolutional node when the target normalization node may be upstream of a target convolutional node, as shown generally by way of example in FIG. 10. In other words, S232 may function to integrate the parameters and/or operations of a target normalization node and the operations of a target (downstream) convolutional node into a single integrated node-pair (e.g., a folded node, a folded layer, etc.) on a per-batch basis.

In operation, an output (y) of a computation of a convolutional node of a transformed network graph of an artificial neural network may be computed by multiplying a kernel (k) of a convolutional filter by an input matrix (x) and adding a bias matrix (b) to the multiplication product thereof, which may be generally represented as y=k*x+b. As previously described above, a computation of a batch normalization node that may normalize node input data into a target convolutional node may be $$x' = \frac{(x-\mu)}{\sigma} * \gamma + \beta.$$

Accordingly, inserting the normalized input (x') into the convolutional computation of the convolutional node yields $$y = k * \left((x-\mu) * \frac{\gamma}{\sigma} + \beta + b\right),$$

which may be mathematically rearranged and expressed as $$y = k * \left(\frac{\gamma}{\sigma} * x\right) - \hat{k} * \left(\frac{\gamma}{\sigma} * \mu\right) + \hat{k} * \beta + b.$$

It shall be noted that the rearranged expression similarly relates to the computation of the pre-fused convolutional node (e.g., y=k*x+b).

Accordingly, the folded operation of the folded node may be y=k'*x+b', where the folded kernel is $$k' = k \circ \frac{\gamma}{\sigma}$$

where $\circ$ is the element-wise multiplication along the input dimension of the convolutional kernel and the folded bias is $$b' = b + \hat{k}\left(\beta - \frac{\gamma}{\sigma} * \mu\right).$$

In other words, the kernel (k') and bias (b') of the integrated node-pair (e.g., folded layer) may include parameters of both the pre-folded batch normalization node and the pre-folded convolutional node.

Weight Folding a Linear Node into a Normalization Node after a Dot Product

Figure 11:
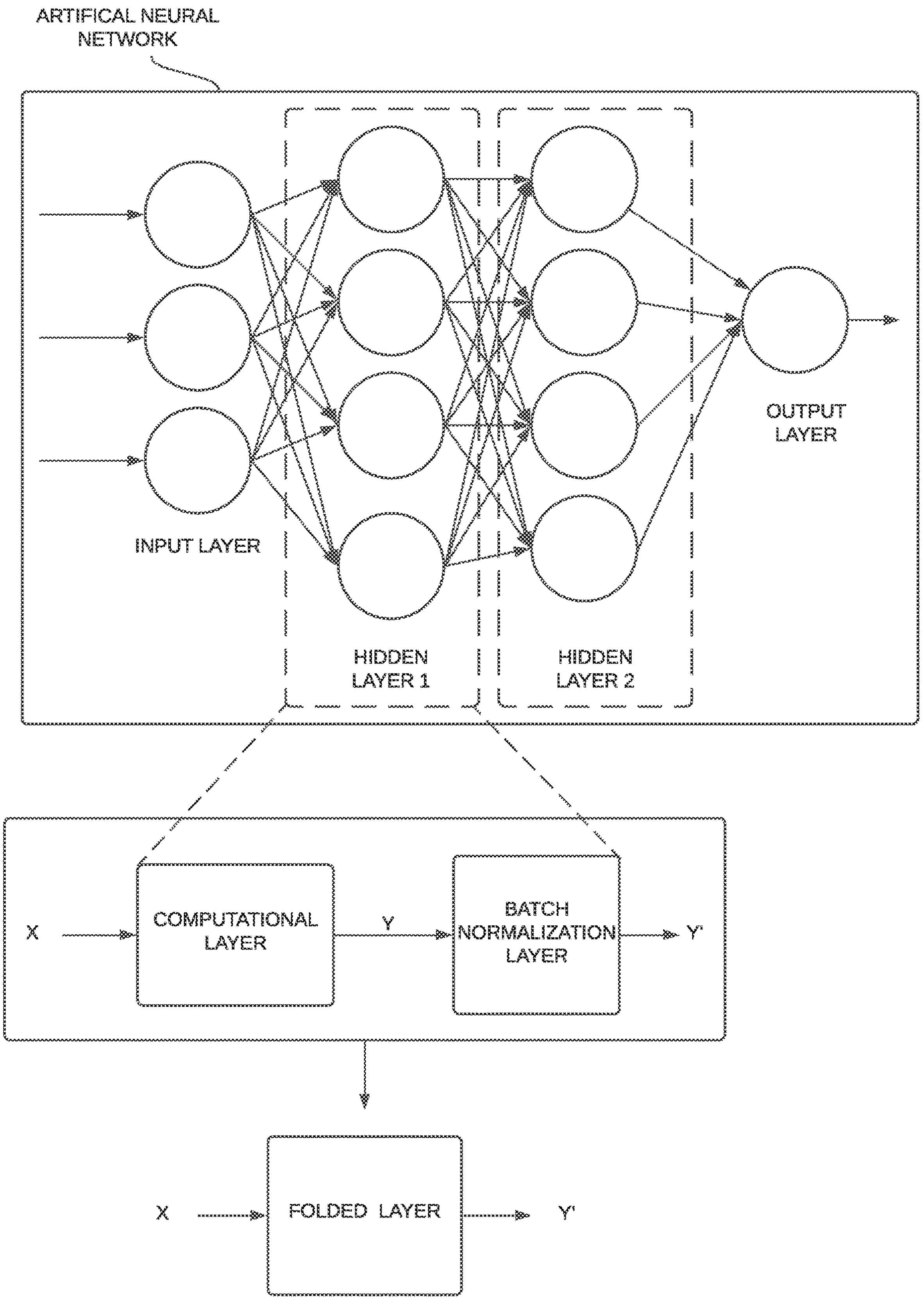
FIG. 11 illustrates an example schematic of folding a computational layer into a batch normalization layer implementing portions of the method 200.

In a third implementation, S232 may function to weight fold a target linear node into a normalization node (e.g., a target batch normalization node) when the target normalization node may be implemented after a target liner node, as shown generally by way of example in FIG. 11. In other words, S232 may function to integrate the operations of a target normalization node and the operations of a target (upstream) linear node of a grouped node or a system-generated node into a single integrated node-pair on a per-batch basis.

Accordingly, in some embodiments, S232 may function to weight fold a target linear node into a target batch normalization node that may be used to normalize outputs (or output activations) computed by an upstream linear node. For instance, as discussed above, a computation of a batch normalization node that may normalize the outputs of a target upstream linear node may be which may be $$y' = \frac{(y - \mu)}{\sigma} * \gamma + \beta,$$

which may be mathematically rearranged and expressed as $$y' = (y - \mu)\frac{\gamma}{\sigma} + \beta.$$

Accordingly, as described above, the computation of an upstream linear node may be $y=W^T*x+b$. Therefore, inserting the above-mentioned expression (e.g., $y=W^T*x+b$) into the computation of the batch normalization expression yields $$y' = \left(W^T * x + b - \mu\right)\frac{\gamma}{\sigma} + \beta,$$

which may be mathematically rearranged as $$y' = W^T\left(\frac{\gamma}{\sigma} * x\right) + (b - \mu)\frac{\gamma}{\sigma} + \beta.$$

Accordingly, the folded operation of the folded node (or integrated node-pair) may be mathematically expressed as $$y = W'^T * x + b', \text{ where } W' = w \circ \frac{\gamma}{\sigma}$$

where $\circ$ is the element-wise multiplication applied across the rows of the weight matrix and $$b' = (b - \mu)\frac{\gamma}{\sigma} + \beta.$$

In other words, the weight matrix (W') and bias matrix (b') of the integrated node-pair (e.g., folded node) may include parameters of both the pre-folded batch normalization node and the pre-folded linear node of the grouped node and/or the system-generated node.

Weight Folding a Convolutional Node into a Normalization Node of a Shared Node after a Dot Product In a fourth implementation, S232 may function to weight fold one or more target convolutional nodes into one or more target normalization nodes when the one or more target normalization nodes may be implemented after one or more target convolutional nodes, as shown generally by way of example in FIG. 11. In other words, S232 may function to fold a convolutional node into a downstream batch normalization node that may be used to normalize outputs computed by an upstream convolutional node.

Accordingly, in operation, S232 may function to integrate the operations of a target normalization node and the operations of a target upstream convolutional node into a single integrated node-pair (e.g., a weight-folded node). For instance, a computation of a batch normalization node that may normalize the outputs of the upstream convolutional node may be $$y' = \frac{(y - \mu)}{\sigma} * \gamma + \beta,$$

which may be mathematically rearranged and expressed as $$y' = (y - \mu)\frac{\gamma}{\sigma} + \beta.$$

Accordingly, the computation of the upstream linear node may be y=k*x+b. Therefore, inserting the above-mentioned convolutional expression (e.g., y=k*x+b) into the computation of the batch normalization expression yields $$y' = ((k * x - b) - \mu)\frac{\gamma}{\sigma} + \beta,$$

which may be mathematically rearranged as $$y' = k\left(\frac{\gamma}{\sigma} * x\right) + (b - \mu)\frac{\gamma}{\sigma} + \beta.$$

Accordingly, the new operation of the folded node (or integrated node-pair) may be mathematically expressed as y=k'*x+b', where $$k' = k \circ \frac{\gamma}{\sigma}$$

where ∘ is element-wise multiplication along the input dimension of the convolutional kernel and $$b' = (b-\mu)\frac{\gamma}{\sigma} + \beta.$$

That is, the fused kernel of the convolution filter (k') and fused bias matrix (b') of the integrated node-pair (e.g., weight-folded node) may include parameters of the pre-folded batch normalization node and the pre-folded convolutional node.

At least one technical benefit of S220 retraining a target artificial neural network with the fused or folded nodes may provide increased control of weight scaling and optionally output scaling as described in more detail below.

3.33 Updating and Scaling a Weight Matrix of a Folded Node

S233, which includes updating and scaling a weight matrix of an integrated node-pair, may function to update and scale one or more weight matrices associated with one or more integrated node-pairs for each training iteration during a training flow, respectively. In one or more preferred embodiments, on a per-batch basis, S230 may function to update and scale the weights associated with each weight matrix of each folded node into a normalized weight matrix. In other words, on a per-batch basis, for each integrated node-pair (e.g., each folded layer) the weight matrix associated with each of the integrated node-pairs may be updated and normalized.

In operation, after fusing or folding at least two layers or nodes as described in S232, S233 may function to individually update and scale each of the weights associated with a weight matrix of each integrated-node pair (e.g., a weight-folded node) during a training flow. In one or more embodiments, S233 may function to implement a weight scaling technique that may function to update and scale each of the weights of the weight matrix of an integrated-node pair, which may include one or more of identifying the weights and biases of a targeted integrated layer-pair, splitting one or more biases of the bias matrix, concatenating the weight and biases into a combined weight and bias matrix, computing the maximum weight representation of the weight matrix using a heuristic, and scaling the weights and biases as a function of the maximum weight representation of the weight matrix.

Identifying a Target Folded Weight Matrix and a Target Folded Bias Matrix

For instance, in one implementation of a weight scaling technique, S233 may function to identify a target weight matrix and a target bias matrix of an integrated node-pair (e.g., a folded layer) during each training iteration (e.g., during each epoch). In such implementations, the identified biases may optionally be split if the integrated circuit is configured for a predetermined number of bias splits (e.g., a bias of 426 may be split across six (6) biases, wherein each of the six (6) biases may be configured to store the maximum possible bias before filling another bias (e.g., <127,127,127,45,0,0>) or a bias of 426 may be split evenly in the least number of splits <106.5,106.5,106.5,106.5,0,0>).

It shall be noted that, in some embodiments, S230 may forego bias splitting if the modeled integrated circuit of the training platform supports an arbitrary number of split biases.

Concatenating the Weight Matrix and the Bias Matrix

Additionally, or optionally, in another step of a weight scaling technique, S233 may function to concatenate the identified weight matrix and the split biases to generate a combined weight and split bias matrix (which may hereafter be referred to as an "integrated node-pair weight and bias matrix") based on the identified weight matrix and the computed split biases of a target folded layer.

In other words, S233 may function to combine a target weight matrix of an integrated node-pair and a target bias matrix of the same integrated node-pair into a single matrix (e.g., integrated node-pair weight and bias matrix).

Computing a Maximum Weight Representation

Additionally, or optionally, in another step of a weight scaling technique, S232 may function to compute an upper bound (or maximum weight representation) of the integrated node-pair weight and bias matrix according to a target heuristic. In one or more embodiments, the target heuristic may be a mean of the integrated node-pair weight and bias matrix, a median of the integrated node-pair weight and bias matrix, a predetermined percentile (e.g., $80^{th}$ percentile, $85^{th}$ percentile, $90^{th}$ percentile, $95^{th}$ percentile or based on 3-sigma and the like) of the integrated node-pair weight matrix and bias matrix, and/or any other suitable type of heuristic.

Scaling the Weight Matrix and the Bias Matrix

In operation, after computing the maximum (or upper bound) weight representation of the integrated node-pair weight and bias matrix for a target integrated node-pair, S233 may scale each of the weights of a weight matrix and each of the biases of bias matrix in relation to the computed maximum (or upper bound) weight representation.

For instance, in one or more embodiments, each of the weights of the weight matrix of a target integrated node-pair may be scaled about the maximum (or upper bound) weight representation according to the expression $$\text{Scaled Weight} = \frac{\text{Target Weight of Weight Matrix}}{\text{Maximum (or Upper Bound) Weight Representation}}$$

and each of the biases of the bias matrix of the integrated node-pair may be scaled about the maximum (or upper bound) weight representation according to the expression $$\text{Scaled Bias} = \frac{\text{Target Bias of Bias Matrix}}{\text{Maximum (or Upper Bound) Weight Representation}}.$$

That is, using the above expressions, each of the weights in the weight matrix of a target integrated node-pair and each of the biases in the bias matrix of the target integrated node-pair may be normalized about the computed maximum (or upper bound) weight representation.

It shall be noted that, in one or more embodiments, one or more scaled weights of the weight matrix and/or one or more scaled biases of the bias matrix may be clipped if the one or more weights are outside of a target range (e.g., −1 to 1).

In some embodiments, the training process may further include splitting a bias value associated with a computational node into multiple bias components for deployment on the integrated circuit. Bias splitting may be beneficial when the target integrated circuit stores biases in multiple programmable memory locations.

In one embodiment, a bias bucketization technique may be implemented in which a bias value is distributed across multiple bias storage locations using a bucket-filling approach. In such an embodiment, each bias storage location may be filled sequentially until a maximum bias value for that location is reached. For example, a bias value of 426 may be distributed across six bias locations as values of <127, 127, 127, 45, 0, 0>. This bucketization technique may ensure that the largest possible values are stored first while minimizing truncation errors that may arise during hardware deployment.

In some embodiments, the bias bucketization technique may improve robustness of the neural network to hardware pruning operations or hardware limits on bias values. Accordingly, distributing biases using bucketization may reduce accuracy degradation during inference on the mixed-signal integrated circuit.

3.34 Boosting or Scaling Output Activations for One or More Integrated Node-Pairs Optionally, S234, which includes boosting or scaling output activations on a per-integrated node-pair basis, may function to apply a layer-based scaling factor that may boost or scale the signal range of the computed output activations associated with an integrated node-pair on a per-batch basis. For instance, in one or more preferred embodiments, a first layer scaling factor (e.g., a first composite scaling factor) may be applied to a first integrated node-pair of an artificial neural network and a second layer scaling factor (e.g., a second composite scaling factor) may be applied to a second integrated node-pair of the artificial neural network.

In such preferred embodiments, the first layer scaling factor (or the first composite scaling factor) may increase the signal range or size of the output activations of the first integrated node-pair and the second layer scaling factor (or the second composite scaling factor) may increase the signal range or size of the output activations of the second integrated-node pair. It shall be noted that as the layer signal range may be increased (or operating at greater bit scale than before scaling) based on an application of a computed composite scaling factor, a value of a signal-to-noise ratio for a given integrated layer pair may be improved because of an increasing signal ratio and a non-increasing noise ratio.

In operation, S234 may function to collectively (or holistically) boost or scale the signal range for one or more target integrated node-pairs by implementing a output activation scaling technique that may optionally include one or more of identifying a dominant channel of the target integrated node-pair, computing a composite scaling factor for the dominant channel of the target integrated node-pair, and scaling all channel activations of the integrated node-pair based on the computed composite scaling factor.

Identifying a Dominant Channel

In one or more embodiments of identifying a dominant channel, S234 may function to identify a dominant channel associated with each integrated node-pair of the artificial neural network. In one or more preferred embodiments, identifying a dominant channel for a target integrated node-pair of the artificial neural network may include measuring each channel within a target integrated node-pair to identify a channel with the largest measured output activations (or the largest measured effective output activations) relative to other measured channels associated with the target integrated node-pair. In some embodiments, to identify such channel (e.g., the dominant channel), S234 may receive as input a measurement of a signal range for each channel of each target integrated node-pair and identify the channel, in which, the maximum measured signal range may have occurred.

Computing a Composite Scaling Factor (CSF)

In one or more embodiments of computing a composite scaling factor (CSF), S234 may function to compute a layer-level scaling factor based on a combination of a signal range value of the dominant channel for a given integrated node-pair and a target channel activations output size or value (e.g., a target code). In one or more preferred embodiments, the layer-level scaling factor (e.g., the composite scaling factor) may be a scaling factor that may function to ensure that the outputs of a target integrated node-pair of an artificial neural network may be operating at a target output scale.

In one or more embodiments, S234 may function to compute a composite scaling factor based on the expression $$\text{Composite Scaling Factor} = \frac{\text{Target Code Value}}{\text{Maximum Dominant Channel Output}}.$$

Accordingly, by using the composite scaling factor, the output activations or an effective representation of the output activations for the dominant channel may reach a target code level. In such embodiments, based on computing the composite scaling factor for the dominant channel, S240 may function to apply (or set) the computed composite scaling factor to all channels of the target integrated node-pair, thereby increasing an average or mean of the signal range for the target layer.

It shall be noted that the composite scaling factor may be set during computations performed by an accelerator (e.g., an MMA, a layer-specific MMA, etc.).

It shall be further noted that, in one or more embodiments, one or more scaled activations or scaled outputs may be clipped if the one or more scaled outputs are outside of a target range (e.g., −1 to 1).

At least one technical advantage of output scaling based on a composite scaling factor may ensure that each layer (e.g., each node of a network graph) of the artificial neural network may be operating at a substantially full bit range or at least a preferred bit range level.

Skip-Link Signal Balancing

Additionally, or alternatively, the transformed network graph may include skip connections or residual connections between nodes of the artificial neural network. Skip connections may be used in deep neural network architectures such as residual networks. In embodiments in which skip connections are present, the training platform may scale signals associated with multiple inputs to a summation node so that the signal ranges of the inputs are approximately balanced. For example, when two or more tensors are combined using an addition node, the output scaling techniques described above may be applied to the inputs to the addition node so that each input tensor has a comparable signal range. In some embodiments, balancing the signal range of tensors that participate in skip connections may reduce clipping of signals during hardware execution and may improve the signal-to-noise ratio of the combined outputs. In some embodiments, the tensors may be combined using an addition operation, a concatenation operation, or any suitable tensor combination operation, including channel-wise concatenation, feature aggregation operations, or weighted combination operations.

3.35 Updating Learnable Parameters to Minimize Loss

S235, which includes updating learnable parameters of the integrated node-pair, may function to update the weights and biases of the integrated node-pair to minimize a computed loss of a neural network predictive accuracy during a training.

In one or more embodiments, for each epoch, S235 may function to compute a loss of a predictive neural network accuracy and in response to computing the loss, S235 may further function to minimize the computed loss by updating the learnable parameters of the plurality integrated node-pairs via backpropagation.

3.40 Generating a Machine-Ready Artificial Neural Network

S240, which includes generating a machine-ready artificial neural network, may function to translate a trained artificial neural network into a machine readable artificial neural network executable by an integrated circuit. In one or more preferred embodiments, S240 may function to generate a machine-ready artificial neural network that may be configured to execute one or more instructions of a trained artificial neural network on a mixed-signal integrated circuit (e.g., the integrated circuit 100).

It shall be noted that, in one or more embodiments, generating a machine-ready artificial neural network may include using a compiler to translate the high-level programming language used to construct and/or configure the trained artificial neural network into a machine language understandable to the integrated circuit.

In some embodiments, generating the machine-ready artificial neural network may further include converting the trained neural network into a hardware execution graph that may be compiled for execution on the mixed-signal integrated circuit. Converting the trained neural network into a hardware execution graph may include removing hardware modeling nodes that were used during training but are not required during inference. For example, a global hardware parameter node that provides simulated temperature values or noise values during training may be removed during the conversion process.

In some embodiments, converting the trained neural network may further include translating the system-generated nodes of the transformed network graph back into hardware-compatible computational nodes (e.g., convolution nodes, linear nodes, addition nodes). In additional embodiments, the conversion process may include inserting input scaling operations and output scaling operations into the hardware execution graph so that the neural network operates within a target signal range of the integrated circuit hardware. Once the hardware execution graph is generated, a compiler may translate the graph into instructions or configuration data suitable for programming the mixed-signal integrated circuit.

4. Computer-Implemented Method and Computer Program Product

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A computer-implemented method for generating a hardware-executable artificial neural network for execution on a matrix multiply accelerator, the method comprising:
- accessing a network graph representing a pre-trained artificial neural network, the network graph comprising a plurality of nodes including at least one computational node configured to perform a weighted sum operation;
- transforming, by one or more processors, the network graph into a transformed network graph by replacing the at least one computational node with a system-generated node comprising:
  - (i) computational operations corresponding to the computational node and
  - (ii) normalization operations associated with a normalization layer;
- initializing one or more normalization parameters of the system-generated node based on statistics derived from training data;
- retraining the artificial neural network using the transformed network graph, the retraining comprising:
  - folding parameters of the normalization operations and parameters of the computational operations to generate an integrated node having a folded weight matrix and a folded bias matrix;
  - updating the folded weight matrix and the folded bias matrix during training iterations;
- scaling the folded weight matrix and the folded bias matrix based on a weight-representation heuristic; and
- scaling output activations associated with the integrated node based on a composite scaling factor that increases a signal-to-noise ratio of the output activations; generating, based on the retraining, a hardware-execution graph corresponding to the artificial neural network; and
- compiling the hardware-execution graph into instructions executable by the matrix multiply accelerator.

2. The computer-implemented method of claim 1, wherein transforming the network graph further comprises identifying an activation node succeeding the computational node and associating an activation function of the activation node with the system-generated node such that the activation function is executed as an attribute of the system-generated node.

3. The computer-implemented method of claim 1, wherein retraining the artificial neural network further comprises modeling hardware characteristics of the matrix multiply accelerator by injecting simulated noise or distortion into intermediate outputs of the transformed network graph.

4. The computer-implemented method of claim 1, wherein scaling the folded weight matrix and the folded bias matrix further comprises splitting a bias value of the folded bias matrix into a plurality of bias components distributed across multiple bias storage locations of the matrix multiply accelerator.

5. The computer-implemented method of claim 1, wherein transforming the network graph further comprises identifying a normalization node adjacent to the computational node and grouping the normalization node and the computational node into the system-generated node.

6. The computer-implemented method of claim 1, wherein folding the parameters of the normalization operations and the parameters of the computational operations comprises folding parameters of a batch normalization operation into parameters of a linear node.

7. The computer-implemented method of claim 1, wherein folding the parameters of the normalization operations and the parameters of the computational operations comprises folding parameters of a batch normalization operation into parameters of a convolutional node.

8. The computer-implemented method of claim 1, wherein scaling the folded weight matrix and the folded bias matrix comprises computing the weight-representation heuristic using at least one of a mean value, a median value, or a percentile value derived from a combined weight and bias matrix.

9. The computer-implemented method of claim 1, wherein scaling the output activations associated with the integrated node further comprises identifying a dominant channel associated with the integrated node and computing the composite scaling factor based on a signal range of the dominant channel.

10. The computer-implemented method of claim 1, wherein the transformed network graph includes a residual connection between nodes of the artificial neural network, and wherein scaling the output activations further comprises balancing signal ranges of tensors associated with the residual connection before combining the tensors at a combination node, the combination node comprising at least one of an addition node or a concatenation node.

11. The computer-implemented method of claim 1, wherein initializing the normalization parameters comprises computing normalization statistics including a mean value and a variance value derived from training data associated with outputs of the computational node.

12. The computer-implemented method of claim 11, wherein initializing the normalization parameters further comprises computing scale and offset parameters based on the normalization statistics.

13. The computer-implemented method of claim 1, wherein retraining the artificial neural network further comprises updating normalization statistics of the system-generated node during training iterations using batches of the training data.

14. The computer-implemented method of claim 1, wherein generating the hardware-execution graph further comprises removing nodes used during retraining that simulate hardware effects and that are not required during inference on the matrix multiply accelerator.

15. The computer-implemented method of claim 1, wherein compiling the hardware-execution graph further comprises inserting scaling operations such that signals propagated between nodes remain within a dynamic range supported by the matrix multiply accelerator.

16. The computer-implemented method of claim 1, wherein the matrix multiply accelerator comprises a plurality of processing tiles including matrix multiply units and local memory units storing weights associated with the artificial neural network.

17. A system for generating a hardware-executable artificial neural network for execution on a matrix multiply accelerator, the system comprising:

one or more processors; and one or more non-transitory computer-readable storage media storing instructions that, when executed by the one or more processors, cause the system to:

access a network graph representing a pre-trained artificial neural network comprising a plurality of nodes including at least one computational node configured to perform a weighted sum operation;

transform the network graph into a transformed network graph by replacing the computational node with a system-generated node comprising computational operations corresponding to the computational node and normalization operations associated with a normalization layer;

initialize normalization parameters of the system-generated node based on statistics derived from training data;

retrain the artificial neural network using the transformed network graph, the retraining comprising folding parameters of the normalization operations and parameters of the computational operations to generate an integrated node having a folded weight matrix and a folded bias matrix;

update the folded weight matrix and the folded bias matrix during training iterations;

scale the folded weight matrix and the folded bias matrix based on a weight-representation heuristic;

scale output activations associated with the integrated node based on a composite scaling factor that increases a signal-to-noise ratio of the output activations;

generate a hardware-execution graph corresponding to the artificial neural network; and compile the hardware-execution graph into instructions executable by the matrix multiply accelerator.

18. The system of claim 17, wherein transforming the network graph further comprises identifying an activation node adjacent to the computational node and associating an activation function of the activation node with the system-generated node.

* * * * *